United States Patent [19]

Pocius et al.

[11] Patent Number: 5,935,711
[45] Date of Patent: Aug. 10, 1999

[54] ORGANOBORANE AMINE COMPLEX INITIATOR SYSTEMS AND POLYMERIZABLE COMPOSITIONS MADE THEREWITH

[75] Inventors: Alphonsus V. Pocius, Maplewood; E. John Deviny, Roseville, both of Minn.

[73] Assignee: 3M Innovative Properties Company, St. Paul, Minn.

[21] Appl. No.: 08/735,765

[22] Filed: Oct. 23, 1996

[51] Int. Cl.$^6$ .............. C07F 5/02; B32B 27/30; B32B 27/32

[52] U.S. Cl. ................ 428/421; 428/355 AC; 428/515; 428/516; 428/500; 428/520; 428/522; 428/422; 564/8; 564/9; 526/196; 526/198

[58] Field of Search .............. 54/8, 9; 526/198, 526/196; 428/355 AC, 421, 515, 516, 500; 425/422, 520, 522

[56] References Cited

U.S. PATENT DOCUMENTS

| | | | |
|---|---|---|---|
| 2,985,633 | 5/1961 | Welch et al. | 260/85.3 |
| 3,141,862 | 7/1964 | Kirshenbaum et al. | 260/45.5 |
| 3,275,611 | 9/1966 | Mottus et al. | 260/80.5 |
| 3,340,193 | 9/1967 | Fields et al. | 252/56 |
| 3,418,260 | 12/1968 | Trofimenko | 260/2 |
| 3,425,988 | 2/1969 | German et al. | 260/47 |
| 3,451,952 | 6/1969 | Slocombe | 260/2.5 |
| 3,476,727 | 11/1969 | Lo Monaco et al. | 260/92.8 |
| 3,527,737 | 9/1970 | Masuhara et al. | 260/78.5 |
| 3,829,973 | 8/1974 | Masuhara et al. | 32/15 |
| 4,167,616 | 9/1979 | Bollinger | 526/197 |
| 4,379,728 | 4/1983 | Lin | 156/307.3 |
| 4,485,229 | 11/1984 | Waddill et al. | 528/111 |
| 4,515,724 | 5/1985 | Ritter | 260/410 |
| 4,524,181 | 6/1985 | Adam et al. | 525/107 |
| 4,638,092 | 1/1987 | Ritter | 568/1 |
| 4,639,498 | 1/1987 | Ritter | 526/196 |
| 4,656,229 | 4/1987 | Chiao | 525/518 |
| 4,676,858 | 6/1987 | Ritter | 156/307.3 |
| 4,684,538 | 8/1987 | Klemarczyk | 427/54.1 |
| 4,721,751 | 1/1988 | Schappert et al. | 524/773 |
| 4,731,416 | 3/1988 | Saunders | 525/131 |
| 4,775,734 | 10/1988 | Goel | 528/89 |
| 4,874,814 | 10/1989 | Cartier et al. | 525/61 |
| 4,904,360 | 2/1990 | Wilson, Jr. et al. | 204/181.7 |
| 4,920,188 | 4/1990 | Sakashita et al. | 526/196 |
| 4,921,921 | 5/1990 | Ritter | 526/195 |
| 4,985,516 | 1/1991 | Sakashita et al. | 526/196 |
| 5,021,507 | 6/1991 | Stanley et al. | 525/127 |
| 5,106,928 | 4/1992 | Skoultchi et al. | 526/196 |
| 5,143,884 | 9/1992 | Skoultchi et al. | 502/160 |
| 5,286,821 | 2/1994 | Skoultchi | 526/196 |
| 5,310,835 | 5/1994 | Skoultchi et al. | 526/198 |
| 5,376,746 | 12/1994 | Skoultchi | 526/196 |
| 5,401,805 | 3/1995 | Chung et al. | 525/288 |
| 5,539,070 | 7/1996 | Zharov et al. | 526/198 |
| 5,616,796 | 4/1997 | Pocius et al. | 564/9 |
| 5,621,143 | 4/1997 | Pocius | 564/8 |
| 5,681,910 | 10/1997 | Pocius | 526/198 |
| 5,684,102 | 11/1997 | Pocius | 526/198 |
| 5,686,544 | 11/1997 | Pocius | 526/196 |
| 5,712,331 | 1/1998 | Ryang | 523/400 |
| 5,718,977 | 2/1998 | Pocius | 428/422 |
| 5,795,657 | 8/1998 | Pocius | 428/516 |

FOREIGN PATENT DOCUMENTS

| | | |
|---|---|---|
| 649582 | 10/1993 | Australia . |
| 664459 | 6/1963 | Canada . |
| 2061021 | 10/1992 | Canada . |
| 0 051 796 | 10/1981 | European Pat. Off. . |
| 0 511 464 A1 | 11/1992 | European Pat. Off. . |
| 42-14318 | 8/1967 | Japan . |
| 45-29195 | 9/1970 | Japan . |
| 46-16888 | 5/1971 | Japan . |
| 48-18928 | 6/1973 | Japan . |
| 53-102394 | 9/1978 | Japan . |
| 62-288675 | 12/1987 | Japan . |
| 3-177470 | 8/1991 | Japan . |
| 3-264509 | 11/1991 | Japan . |
| 93-235089 | 9/1993 | Japan . |
| A-7-138544 | 5/1995 | Japan . |
| A-8-134408 | 5/1995 | Japan . |
| A-7-138542 | 5/1996 | Japan . |
| 904403 | 8/1962 | United Kingdom . |
| 988632 | 4/1965 | United Kingdom . |
| 1113722 | 5/1968 | United Kingdom . |
| 1132261 | 10/1968 | United Kingdom . |

OTHER PUBLICATIONS

Studies on Dental Self–Curing Resins (II), S. Fujisawa, Y Imai and E. Masuhara, *Reports on the Institute for Medical & Dental Engineering*, vol. 3, pp. 64–71 (1969).

JP 3229777 (English abstract of the Japanese publication) Oct. 11, 1991.

The Trialkylborane–initiated Graft Copolymerization of Methyl Methacrylate onto Hemoglobin, K. Kojima, S. Iwabuchi and K. Kojima, *Bulletin of the Chemical Society of Japan*, vol. 44, pp. 1891–1895 (1971).

A New Method for the Graft Copolyermerization of Methyl Methacrylate onto Proteins and Fibers, *Polymer Letters*, vol. 9, pp. 25–29 (1971).

The Grafting of Methyl Methacrylate onto Cotton by Tri–n–butylborane, K. Kojima, S. Iwabuchi, K. Murakami, K. Kojima and F. Ichikawa, *Journal of Applied Polymer Science*, vol. 16, pp. 1139–1148 (1972).

Grafting of Vinyl Monomers by Tri–n–Butylborane onto Chlorophyll and Related Compounds, *Polymer Letters Edition*, vol. 13, pp. 361–363 (1975).

(List continued on next page.)

*Primary Examiner*—Paul Thibodeau
*Assistant Examiner*—D. Lawrence Tarazano
*Attorney, Agent, or Firm*—Steven E. Skolnick

[57] ABSTRACT

A composition comprises organoborane amine complex and aziridine-functional material. The composition can form a part of a polymerization initiator system that also includes a compound that is reactive with the amine portion of the complex. The system can be used to initiate polymerization of acrylic monomer and to form an acrylic adhesive that has exceptionally good adhesion to low surface energy polymers.

41 Claims, No Drawings

OTHER PUBLICATIONS

Tributylborane–Initiated Grafting of Methyl Methacrylate onto Chitin, K. Kojima, M. Yoshikuni and T. Suzuki, *Journal of Applied Polymer Science*, vol. 24, pp. 1587–1593 (1979).

Grafting of Methyl Methacrylate onto Silk Fibers Initiated by Tri–n–Butylborane, M. Tsukada, T. Yamamoto, N. Nakabayashi, H. Ishikawa and G. Freddi, *Journal of Applied Polymer Science*, vol. 43, pp. 2115–2121 (1991).

Molecular Weight Distribution of the Methyl Methacrylate (MMA) Polymer Separated from the MMA–Grafted Silk Fiber, M. Tsukada, Y. Goto, G. Freddi, T. Yamamoto and N. Nakabayashi, *Journal of Applied Polymer Science*, vol. 44, pp. 2197–2202 (1992).

Synthesis of Functionalized Polypropylene and Polypropylene–Polymethylmethacrylate Graft Copolymer, D. Rhubright and T.C. Chung, Proceedings of the American Chemical Society, *Polymeric Materials Science and Engineering*, vol. 67, pp. 112–113 (1992).

Polymerization of Acrylonitrile in Presence of Tributylborine, G. Kolesnikov and L. Fedorova, translated from *Bull. Acad. Sci. USSR, Div. Chem. Sci.*, p. 236 (1957).

Tributylborine: A Catalyst for the Polyermization of Unsaturated Compounds, G. Kolesnikov and N.V. Klimentova, translated from *Bull. Acad. Sci. USSR, Div. Chem. Sci.*, p. 653 (1957).

Triethylboron as an Initiator for Vinyl Polymerization, J. Furukawa, T. Tsuruta and S. Inoue, *Journal of Polymer Science*, vol. XXVI, Issue No. 113, pp. 234–236 (1957).

Oxygen Compounds as Cocatalyst for Triethylboron–Catalyzed Vinyl Polymerization, J. Furukawa and T. Tsuruta, *Journal of Polymer Science*, vol. XXVIII, Issue No. 116, pp. 227–229 (1958).

Mechanism of the Polymerization of Acrylonitrile in Presence of Tributylborine, G. Kolesnikov and L. Fedorova, translated from *Bull. Acad. Sci. USSR, Div. Chem. Sci.*, p. 906 (1958).

Mechanism of Trialkylboron Initiated Polymerization, J. Fordham and C. Sturm, *Journal of Polymer Science*, vol. XXXIII, No. 126, pp. 503–504 (1958).

Cocatalytic Activity of Some Metal Salts on Vinyl Polmerization with Tributhylboron, I. M. Panayotov, *Comptes rendus de l'Academie bulgare des Sciences*, vol. 14, No. 2, pp. 147–150 (1961).

Polymerization with Organoboron Compounds, F. Arimoto, *Journal of Polymer Science: Part A–1*, vol. 4, pp. 275–282 (1966).

On the Existence of a Free–Radical Organoboron Complex in the Polymerization of Methyl Methacrylate, R. Kern and J. Schaefer, *Polymer Letters*, vol. 5, pp. 157–162 (1967).

Vinyl Monomer Polymerization Mechanism in the Presence of Trialkylboranes, J. Grotewold, E. Lissi and A. Villa, *Journal of Polymer Science: Part A–1*, vol. 6, pp. 3157–3162 (1968).

Free–Radical Polymerization of Methyl Methacrylate in the Presence of Trialkylboranes, P. Brindley and R. Pearson, *Polymer Letters*, vol. 6, pp. 831–835 (1968).

Ethylene Polymerization in Presence of Tributylboron, G. Kolesnikov and T. Soboleva, *Scientific and Research Publications of the Members of the All Union Chemical Society Name After Mendilev*, vol. 2, p. 663 (1957).

Free–Radical Copolymerization of 1,2–Dichloroethylenes. Evidence for Chain Transfer by Chlorine Atom Elimination, T. Dawson, R. Lundberg and F. Welch, *Journal of Polymer Science: Part A–1*, vol. 7, pp. 173–181 (1969).

Mechanism of Vinyl Monomer Polymerization in the Presence of Trialkylboranes and Inhibitors, E. Aranchibia et al., *Journal of Polymer Science: Part A–1*, vol. 7, pp. 3430–3433 (1969).

Polymerization of Methyl Methacrylate by Trialkylborane–Pyridine System, K. Kojima et al., *Polymer Letters*, vol 8, pp. 541–547 (1970).

Polymerization Initiated by Triethylborane–Peroxide Mixtures, E. Abuin et al., *Polymer Letters*, vol. 7, pp. 515–518 (1970).

Polymerization of Methyl Methacrylate by Co–ordination Compounds of Tri–n–butylborane with Some Electron–donating Compounds, Kojima et al., *Research Report of the Chiba University Faculty of Engineering*, vol. 22, No. 41, pp. 47–55.

Polymerization of Methyl Methacrylate Initiated by Tri–n–butylborane–Organic Halide Systems, M. Yoshikuni, M. Asami, S. Iwabuchi and K. Kojima, *Journal of Polymer Science*, vol. 11, pp. 3115–3124 (1973).

Polymerization of Methyl Methacrylate Initiated by Tributylborane–Pyridine System, Kojima et al., *Journal of the Japanese Chemical Society*, No. 11, pp. 2165–2171 (1972).

The Copolymerization of Vinylhydroquinone and Acrylonitrile by Tri–n–butylborane, S. Iwabuchi, M. Ueda, M. Kobayashi and K. Kojima, *Polymer Journal*, vol. 6, No. 2, pp. 185–190 (1974).

Free Radical Polymerization in the Presence of Triethylborane, E. Abuin, J. Cornejo and E. Lissi, *European Polymer Journal*, vol. 11, pp. 779–782 (1975).

Polymerization of Methyl Methacrylate by tri–n–butylborane in the presence of amino acid esters, K. Kojima, S. Iwabuchi, Y. Moriya and M. Yoshikuni, *Polymer*, vol. 16, pp. 601–604 (1975).

Analysis of Mechanism of Radical Formation Resulted from the Initiator System of Triethylboron and Oxygen by Spin Trapping Technique, Sato et al., *Journal of the Japanese Chemical Society*, No. 6, pp. 1080–1084 (1975).

Development of Adhesive Pit and Fissure Sealants Using a MMA Resin Initiated by a Tri–n–butyl Borane Derivative, N. Nakabayashi and E. Masuhara, *Journal of Biomedical Materials Research*, vol. 12, pp. 149–165 (1978).

Vinyl Acetate Polymerization Initiated by Alkylborane–oxidizer–type Systems, S. Ivanchev, L. Shumnyi and V. Konovalenko, *Polymer Science U.S.S.R.*, vol. 22, No. 12, pp. 8000–8006 (1980).

Preparation of Hard Tissue Compatible Materials: Dental Polymers, N. Nakabayashi and E. Masuhara, *Biomedical Polymers*, pp. 85–111 (1980).

Mechanism of Initiation of Polymerization of Vinyl Monomers by Means of the Trialkylborane–Acid System, S. Ivanchev and L. Shumnyi, translated from Doklady Akademii Nauk SSSR, vol. 270, No. 5, pp. 1127–1129 (1983).

Effect of Organic Bases on Initiating Properties in the System Boronalkylelemental Organic Peroxide During Vinylchloride Polymerization, T. Guzanova, Master Thesis of the Fifth (graduate) year student, Ministry of High and Secondary Special Education Russia, Gorky State University (1983).

Application of Spin Trapping Technique to Radical Polymerization, 20, T. Sato, N. Fukumura and T. Otsu, *Makromol. Chem.*, 184, pp. 431–442 (1983).

Importance of Polymerization Initiator Systems and Interfacial Initiation of Polymerization in Adhesive Bonding of Resin to Dentin, Y. Imai, Y. Kadoma, K. Kojima, T. Akimoto, K. Ikakura and T. Ohta, *J. Dent. Res.,* vol. 70, No. 7, pp. 1088–1091 (1991).

Vibrational Analysis by Raman Spectroscopy of the Interface Between Dental Adhesive Resin and Dentin, M. Suzuki, H. Kato and S. Wakumoto, *J. Dent. Res.,* vol. 70, No. 7, pp. 1092–1097 (1991).

Laser–Raman Spectroscopic Study of the Adhesive Interface Between 4–MET/MMA–TBB Resin and Hydroxyapatite or Bovine Enamel, M. Ozaki, M. Suzuki, K. Itoh and S. Wakumoto, *Dental Materials Journal,* vol. 10, No. 2, pp. 105–120 (1991).

Polymerization of Some Vinyl Monomers on Triisobutylboron–Containing Radical Initiators in the Presence of Hydroquinone and Benzoquinone, V. Dodonov and D. Grishin, *High Molecular Compounds,* vol. 35, No. 3, pp. 137–141 (1993).

Synthesis of PP–g–PMMA, PP–g–PVA and PP–g–PCL Copolymers, D. Rhubright and T. Chung, American Chemical Society, Division of Polymer Chemistry, Papers Presented at the Chicago, Illinois Meeting, vol. 34, No. 2, pp. 560–561 (1993).

Functionalized and Grafted Polyolefin Copolymers Prepared by Tansition Metal Catalysts and Borane Monomers, T. Chung, *Polymer Reprints,* vol. 35, No. 1, pp. 674–675 (1994).

Photochemical Modification of Fluorocargon Resin Surface to Adhere with Epoxy Resin, M. Okoshi, T. Miyokawa, H. Kashiura and M. Murahara, *Mat. Res. Soc. Symp. Proc.,* vol. 334, pp. 365–371 (1994).

Chemical Abstract No. 88532r, *Chemical Abstracts,* vol. 73, 1970.

Chemical Abstract No. 134385q, *Chemical Abstracts,* vol. 80, 1974.

ORGANOBORANE AMINE COMPLEX INITIATOR SYSTEMS AND POLYMERIZABLE COMPOSITIONS MADE THEREWITH

BACKGROUND OF THE INVENTION

1. Field of the Invention

This invention relates generally to organoborane amine complex initiator systems and, more specifically, to systems in which the complex is carried in an aziridine-functional material. The invention further relates to polymerizable compositions made therewith, particularly two-part acrylic adhesive compositions. The adhesive compositions have excellent adhesion to a variety of substrates, especially low surface energy polymers.

2. Description of the Related Art

An efficient, effective means for adhesively bonding low surface energy plastic substrates such as polyethylene, polypropylene and polytetrafluoroethylene (e.g., TEFLON) has long been sought. The difficulties in adhesively bonding these materials are well known. See, for example, "Adhesion Problems at Polymer Surfaces" by D. M. Brewis that appeared in *Progress in Rubber and Plastic Technology*, volume 1, page 1 (1985).

The conventional approaches often use complex and costly substrate surface preparation techniques such as flame treatment, corona discharge, plasma treatment, oxidation by ozone or oxidizing acids, and sputter etching. Alternatively, the substrate surface may be primed by coating it with a high surface energy material. However, to achieve adequate adhesion of the primer, it may be necessary to first use the surface preparation techniques described above. All of these techniques are well known, as reported in *Treatise on Adhesion and Adhesives* (J. D. Minford, editor, Marcel Dekker, 1991, New York, volume 7, pages 333 to 435). The known approaches are frequently customized for use with specific substrates. As a result, they may not be useful for bonding low surface energy plastic substrates generally.

Moreover, the complexity and cost of the presently known approaches do not render them particularly suitable for use by the retail consumer (e.g., home repairs, do-it-yourselfers, etc.) or in low volume operations. One vexing problem is the repair of many inexpensive everyday household articles that are made of polyethylene, polypropylene or polystyrene such as trash baskets, laundry baskets and toys.

Consequently, there has been a considerable and long felt need for a simple, easy to use adhesive that can readily bond a wide variety of substrates, especially low surface energy materials, such as polyethylene, polypropylene and polytetrafluoroethylene, without requiring complicated surface preparation, priming and the like.

While an adhesive that can bond low surface energy plastics is certainly advantageous, the commercial utility of such an adhesive would be enhanced if the components thereof could be combined in a convenient mix ratio. This would permit facile application of the adhesive using conventional adhesive dispensers without the need for laborious hand weighing and mixing of the different components. However, the convenient mix ratio should not come at the expense of significantly reduced storage stability or performance. Thus, there is not only a need for an adhesive that can bond low surface energy plastics, but a need for such an adhesive that can be readily blended in a convenient mix ratio.

It may be desirable for such adhesives to possess other attributes. For example, polymerizable acrylic adhesives are often associated with a strong and unpleasant odor. While not affecting performance, the odor may discourage some people from using these adhesives and encourage them to select other, perhaps more expensive, alternatives. In addition, for certain situations, it may be helpful to have a readily crosslinkable adhesive to form the high strength adhesive bonds demanded in structural bonding applications.

As explained more fully hereinbelow, the organoborane amine complex initiator systems and the related compositions of the invention (which include aziridine-functional material and acrylic monomer that can polymerize to acrylic adhesives) not only satisfy these demands but offer many other advantages.

Organoboranes such as tributylborane and triethylborane have been reported to initiate and catalyze the polymerization of vinyl monomers (see, for example, G. S. Kolesnikov et al., Bull. Acad. Sci. USSR, Div. Chem. Sci. 1957, p. 653; J. Furakawa et al., Journal of Polymer Science, volume 26, issue 113, p. 234, 1957; and J. Furakawa et al., Journal of Polymer Science, volume 28, issue 116, 1958). The organoborane compounds of the type described in these references are known to be quite pyrophoric in air which complicates facile use.

Chemical Abstracts No. 134385q (volume 80, 1974) "Bonding Polyolefin or Vinyl Polymers" reports that a mixture of 10 parts methyl methacrylate, 0.2 part tributylborane, and 10 parts poly(methylmethacrylate) was used to bond polyethylene, polypropylene and poly(vinyl acetate) rods.

U.S. Pat. No. 3,275,611 to E. H. Mottus et al. discloses a process for polymerizing olefinic compounds (e.g., methacrylate monomers) with a catalyst comprising an organoboron compound, a peroxygen compound, and an amine. The organoboron compound and the amine may be added to the reaction mixture separately or they may be added as a preformed complex.

British Patent Specification No. 1,113,722 "Aerobically Polymerisable Compositions," published May 15, 1968 discloses the polymerization of acrylate monomers through the use of a free-radical catalyst (e.g., peroxides) and triarylborane complexes having the general formula $(R)_3B$—Am wherein R is an aryl radical and Am is an amine. The resulting compositions are reportedly useful as adhesives.

Chemical Abstracts No. 88532r (volume 73, 1970) "Dental Self-curing Resin" and the full text paper to which it refers report that tributylborane can be made stable in air by complexing it with ammonia or certain amines and that the tributylborane can be reactivated with an amine acceptor such as an isocyanate, an acid chloride, a sulfonyl chloride, or acetic acid anhydride. As a result, the complex can be used to polymerize blends of methyl methacrylate and poly(methylmethacrylate) to provide a dental adhesive.

A series of patents issued to Skoultchi or Skoultchi et al. (U.S. Pat. Nos.: 5,106,928; 5,143,884; 5,286,821; 5,310, 835; and 5,376,746) disclose a two part initiator system that is reportedly useful in acrylic adhesive compositions, especially elastomeric acrylic adhesives. The first part of the two part system includes a stable organoborane amine complex and the second part includes a destabilizer or activator such as an organic acid or an aldehyde.

U.S. Pat. No. 5,539,070 (Zharov et al.) discloses a polymerizable acrylic composition that comprises at least one acrylic monomer, an effective amount of certain organoborane amine complexes, and an effective amount of an acid for initiating polymerization of the acrylic monomer. The acrylic composition is especially useful as an acrylic adhesive for bonding low surface energy polymers.

Aziridine-functional materials have been widely used for crosslinking pressure sensitive adhesives and as well as in coatings.

SUMMARY OF THE INVENTION

In general, this invention pertains to polymerization initiator systems that are particularly useful in providing two-part curable compositions, especially those that are acrylic adhesives. Broadly, and in one aspect of the invention, the polymerization initiator systems include an organoborane amine complex and an aziridine-functional material. Preferably, the complex and the aziridine-functional material form a solution (even more preferably a liquid solution) at room temperature.

A variety of organoborane amine complexes may be used in the invention and the following structure is representative of those that are suitable:

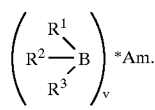

In this structure:

$R^1$ is an alkyl group having 1 to 10 carbon atoms;

$R^2$ and $R^3$ are independently selected from alkyl groups having 1 to 10 carbon atoms and phenyl-containing groups;

Am is an amine which may be selected from various materials including ammonia, monoamine, alkyl polyamine, polyoxyalkylenepolyamine, and the reaction product of a diprimary amine-terminated material and a material having at least two groups reactive with primary amine, wherein the number of primary amine groups in the reaction mixture was greater than the number of groups reactive with primary amine; and the value of v is selected so as to provide an effective ratio of primary amine nitrogen atoms to boron atoms in the complex, which, preferably, is a ratio of about 1:1.

A wide variety of aziridine-functional materials may be used, including monofunctional aziridines and polyaziridines, although the latter are preferred, especially if they have an aziridine functionality of 2 to 4. Among those polyaziridines which are particularly preferred are tris-aziridine or tris-methyl aziridine of trimethylolpropane triacrylate, and tris-aziridine or tris-methyl aziridine of pentaerythritol triacrylate.

The polymerization initiator systems of the invention may further include a compound that is reactive with the amine component of the complex and can liberate the organoborane for initiating polymerization of acrylic monomer. Useful amine reactive compounds include acid, aldehyde and anhydride. Isocyanates, acid chlorides and sulfonyl chlorides may also be used but are less preferred. Acrylic acid, methacrylic acid and their anhydrides as well as mixtures of their anhydrides with non-polymerizable anhydrides are particularly desirable because of their ability to react with a polyaziridine to generate an acrylic crosslinking agent in situ. Preferably, the number of equivalents of amine reactive groups is equal to the sum of the number of equivalents of amine functionality plus the number of equivalents of aziridine functionality in the composition.

In another aspect, the invention relates to a polymerizable composition comprising organoborane amine complex, aziridine-functional material, amine reactive compound, and polymerizable acrylic monomer. The polymerizable acrylic monomer is preferably a monofunctional acrylate ester or a monofunctional methacrylate ester (including substituted derivatives and blends of these materials). A blend of an alkyl acrylate and an alkyl methacrylate is particularly preferred.

The polymerizable compositions are particularly useful in providing a 100% reactive, two-part, curable (at room temperature) adhesive composition. One part comprises organoborane amine complex and aziridine-functional material (preferably as a solution). The other part comprises polymerizable acrylic monomer and amine reactive compound. The amine reactive compound is provided in an amount sufficient to liberate the organoborane for initiating polymerization of the acrylic monomer, and, in preferred embodiments, for reacting with the aziridine-functional material to generate an acrylic crosslinking agent in situ. The two parts of the adhesive may be readily combined in a convenient, commercially useful, whole number mix ratio of 1:10 or less, more preferably 1:4, 1:3, 1:2 or 1:1, such that they can be easily used with two-part adhesive dispensers.

The solubility of the organoborane amine complex in the aziridine-functional material enables the provision of a two-part adhesive. The complex can be separated from other constituents with which it may react. This can improve the storage stability of the adhesive composition as well as afford the independent advantage of being able to form an acrylic crosslinking agent.

The compositions of the invention have excellent adhesion to low surface energy substrates such as polyethylene, polypropylene and polytetrafluoroethylene. Thus, in another aspect, the invention relates to bonded composites comprising a first substrate and a second substrate (preferably low surface energy polymeric materials) adhesively bonded together by a layer of a cured adhesive composition according to the invention. Adhesion to such substrates is promoted by using an effective amount of the organoborane amine complex, which is broadly about 0.03 to 1.5 weight % boron, based on the weight of the entire composition less the weight of fillers, non-reactive diluents, and other non-reactive components in the polymerizable composition. More preferably, the composition contains about 0.08 to 0.5 weight % boron, and most preferably 0.1 to 0.3 weight % boron.

DETAILED DESCRIPTION OF THE PREFERRED EMBODIMENTS

In general, this invention pertains to polymerization initiator systems that are particularly useful in providing two-part curable compositions, especially those that cure (i.e., polymerize) to acrylic adhesives. Broadly, and in one aspect of the invention, the polymerization initiator systems include an organoborane amine complex and an aziridine-functional material. As explained below, the aziridine-functional material is advantageously both a carrier (extender) for the organoborane amine complex and reactive with other constituents of the polymerization initiator system. More specifically, the polymerization initiator systems of the invention comprise and, more preferably, consist essentially of organoborane amine complex, aziridine-functional material, and a material that is reactive with amine for liberating the organoborane.

The organoborane component of the complex initiates free-radical polymerization of acrylic monomer to form an acrylic polymer that can be useful as an acrylic adhesive. To stabilize the organoborane against premature oxidation it is complexed with amine. The organoborane is liberated from the complex by reacting the amine portion of the complex with the amine-reactive material. The acrylic adhesives of the invention can bond a wide variety of substrates, but provide exceptionally good adhesion to low surface energy plastic substrates (e.g., polyethylene, polypropylene, polytetrafluoroethylene, etc.) that, heretofore, have been bonded using complex and costly surface preparation techniques.

The aziridine-functional material enables the provision of a storage stable initiator system that can be directly combined with polymerizable monomers for a two-part adhesive in a convenient, commercially useful, whole number mix ratio of 1:10 or less. Moreover, and quite advantageously, if the aziridine-functional material is a polyaziridine and if the amine-reactive material can promote a ring-opening reaction of the aziridine groups in the polyaziridine, then an acrylic polymer crosslinking agent can be generated in situ. Crosslinkable, two-part, structural acrylic adhesives can be provided. The aziridine-functional material, amine-reactive material, and acrylic monomer are, individually, reactive materials with molecular weights (or weight average molecular weights) of less than about 3,000, more preferably less than about 1,000, and most preferably less than about 750. As a result, the invention also provides a fully reactive, 100% solids, polymerizable adhesive composition.

Organoborane amine complexes useful in the invention are complexes of organoborane and amine. They preferably have the following general structure:

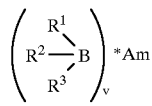

where $R^1$ is an alkyl group having 1 to 10 carbon atoms, and $R^2$ and $R^3$ are independently selected from alkyl groups having 1 to 10 carbon atoms and phenyl-containing groups. More preferably, $R^1$, $R^2$ and $R^3$ are alkyl groups having 1 to 5 carbon atoms such as methyl, ethyl, propyl, iso-propyl, n-butyl, iso-butyl, and pentyl. By "independently selected" it is meant that $R^2$ and $R^3$ may be the same or that they may be different. $R^1$ may be the same as $R^2$ or $R^3$, or it may be different. Preferably $R^1$, $R^2$ and $R^3$ are the same. Most preferred are complexes in which $R^1$, $R^2$ and $R^3$ are each ethyl groups.

The value of v is selected so as to provide an effective ratio of primary amine nitrogen atoms to boron atoms in the complex. The primary amine nitrogen atom to boron atom ratio in the complex is broadly about 1:1 to 4:1. Preferably, however, the ratio is about 1:1 to 2:1, more preferably about 1:1 to 1.5:1, and most preferably about 1:1. (In the case of an amine that contains both primary and secondary amine groups, the ratio of primary amine nitrogen atom to boron atom could be as low as 0.5:1.) A primary amine nitrogen atom to boron atom ratio of less than 1:1 could leave free organoborane, a material that tends to be pyrophoric. At primary amine nitrogen atom to boron atom ratios in excess of 2:1, the practical utility of the complex in, for example, an adhesive system diminishes as the amount of complex that must be employed to generate a useful adhesive becomes larger.

"Am" represents the amine portion of the complex and may be provided by a wide variety of materials having at least one amine group, including blends of different amines. More preferably, "Am" is a polyamine (a material having two or more amine groups). While polyamines having two to four amine groups are especially preferred, polyamines with two amine groups (i.e., diamines) are most preferred.

In one embodiment "Am" may be a primary or secondary monoamine, such as those represented by the structure

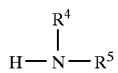

wherein $R^4$ and $R^5$ are independently selected from the group consisting of hydrogen and alkyl groups having 1 to 10 carbon atoms, and alkylaryl groups in which the amine group is not directly attached to the aryl structure. Particular examples of these amines include ammonia, ethylamine, butylamine, hexylamine, octylamine, and benzylamine.

In another embodiment, the amine may be a polyamine such as those described by the structure $H_2N-R^6-NH_2$ in which $R^6$ is a divalent, organic radical comprised of an alkyl, aryl or alkylaryl group. Preferred among these materials are alkane diamines which may be branched or linear, and having the general structure

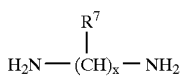

in which x is a whole number greater than or equal to 1, more preferably about 2 to 12, and $R^7$ is hydrogen or an alkyl group, preferably methyl. Particularly preferred examples of alkane diamines include 1,2-ethanediamine, 1,3-propanediamine, 1,5-pentanediamine, 1,6-hexanediamine, 1,12-dodecanediamine, 2-methyl-1,5-pentane diamine, 3-methyl-1,5-pentane diamine, and isomers of these materials. While alkane diamines are preferred, other alkyl polyamines may be used such as triethylene tetraamine and diethylene triamine.

Useful polyamines may also be provided by a polyoxyalkylenepolyamine. Polyoxyalkylenepolyamines suitable in making complexes for the invention may be selected from the following structures:

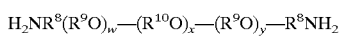

(i.e., polyoxyalkylene diamines); or

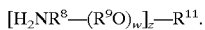

$R^8$, $R^9$ and $R^{10}$ are alkylene groups having 1 to 10 carbon atoms and may be the same or may be different. Preferably, $R^8$ is an alkyl group having 2 to 4 carbon atoms such as ethyl, n-propyl, iso-propyl, n-butyl or iso-butyl. Preferably, $R^9$ and $R^{10}$ are alkyl groups having 2 or 3 carbon atoms such as ethyl, n-propyl or isopropyl. $R^{11}$ is the residue of a polyol used to prepare the polyoxyalkylenepolyamine (i.e., the organic structure that remains if the hydroxyl groups are removed). $R^{11}$ may be branched or linear, and substituted or unsubstituted (although substituents should not interfere with oxyalkylation reactions).

The value of w is $\geq 1$, more preferably about 1 to 150, and most preferably about 1 to 20. Structures in which w is 2, 3 or 4 are useful too. The value of x and y are both $\geq 0$. The value of z is >2, more preferably 3 or 4 (so as to provide, respectively, polyoxyalkylene triamines and tetraamines). It is preferred that the values of w, x, y and z be chosen such that the resulting complex is a liquid at room temperature ("room temperature" refers to, herein, a temperature of about 20 to 22° C.) as this simplifies handling and mixing thereof Usually, the polyoxyalkylenepolyamine is itself a liquid. For the polyoxyalkylene, molecular weights of less than about 5,000 may be used, although molecular weights of about 1,000 or less are more preferred, and molecular weights of about 250 to 1,000 are most preferred.

Examples of particularly preferred polyoxyalkylenepolyamines include polyethyleneoxidediamine, polypropyleneoxidediamine, polypropyleneoxidetriamine, diethyleneglycolpropylenediamine, triethyleneglycolpropylenediamine, polytetramethyleneoxidediamine, polyethyleneoxide-co-polypropyleneoxidediamine, and polyethyleneoxide-co-polypropyleneoxidetriamine.

Examples of suitable commercially available polyoxyalkylenepolyamines include various JEFFAMINES from Huntsman Chemical Company such as the D, ED, and EDR series diamines (e.g., D400, D-2000, D-5000, ED-600, ED-900, ED-2001, and EDR-148), and the T series triamines (e.g., T-403), as well as DCA-221 from Dixie Chemical Company.

The polyamine may also comprise the condensation reaction product of diprimary amine-terminated material (i.e., the two terminal groups are primary amine) and one or more materials containing at least two groups reactive with primary amine (referred to herein at times as "difunctional primary amine-reactive material"). Such materials are preferably substantially linear so as to have the following general structure E—(L—E)$_u$—L—E in which each E is the residue of the diprimary amine-terminated material and each L is a linking group that is the residue of the difunctional primary amine-reactive material. (By "residue" is meant those portions of the diprimary amine-terminated material and the difunctional primary amine-reactive material that remain after reaction to form the polyamine adduct.)

The E and L groups are independently selected. That is, each E group may be the same or may be different, as may each L group, although it is preferred that each E group be the same and that each L group be the same. Preferably E and L are selected so as to form a complex that is soluble in acrylic monomer. The majority (more than 50%) of the terminal groups in the polyamine should be primary amine.

The value of u is selected so as to provide both a polyamine and a complex of useful viscosity. Preferably both the polyamine and the complex are liquid at room temperature. Consequently, the value of u may be greater than or equal to zero, although a value of about 0 to 5 is more preferred, and a value of 0 or 1 is most preferred.

The diprimary amine-terminated material may be alkyl diprimary amine, aryl diprimary amine, alkylaryl diprimary amine, a polyoxyalkylenediamine (such as those described above), or mixtures thereof Useful alkyl diprimary amines include those having the structure NH$_2$—R$^{12}$—NH$_2$ wherein R$^{12}$ is a linear or branched alkyl group having about 1 to 12 carbon atoms such as 1,3-propane diamine, 1,6-hexanediamine, and 1,12-dodecanediamine. Other useful alkyl diprimary amines include triethylene tetraamine and diethylene triamine. Examples of useful aryl diprimary amines include 1,3- and 1,4-phenylene diamine as well as the various isomers of diaminonaphthalene. An example of a useful alkylaryl diprimary amine is m-tetramethylxylene diamine.

Difunctional primary amine-reactive materials contain at least two groups reactive with primary amine. The reactive groups may be different, but it is preferred that they be the same. Difunctional primary amine-reactive materials having a functionality of 2 (i.e., two groups reactive with primary amine) are preferred. Useful difunctional primary amine-reactive materials may be generally represented by the formula Y—R$^{13}$—Z wherein R$^{13}$ is a divalent organic radical such as an alkyl, aryl or alkylaryl group or combination thereof, and Y and Z are groups reactive with primary amine and which may be the same or may be different. Examples of useful Y and Z groups reactive with primary amine include carboxylic acid (—COOH), carboxylic acid halide (—COX where X is a halogen, for example chlorine), ester (—COOR), aldehyde (—COH), epoxide

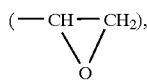

amine alcohol (—NHCH$_2$OH), and acrylic

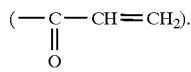

Suitable carboxylic acid-functional materials are preferably those which are useful in forming polyamides, for example, cyclohexane-1,4-dicarboxylic acid and dicarboxylic acids having the structure HOOC—R$^{14}$—COOH in which R$^{14}$ is a linear alkyl group having about 2 to 21 carbon atoms. Aromatic dicarboxylic acids (e.g., terephthalic and isophthalic acids) may be used as can alkylaryl dicarboxylic acids, especially in combination with alkyl dicarboxylic acids.

Useful carboxylic acid halide-functional materials and ester-functional materials include those which are obtained by derivatizing the above-described carboxylic acid-functional materials.

Suitable aldehyde-functional materials include alkyl, aryl and alkylaryl dialdehydes such as oxaldehyde propanedialdehyde, succinaldehyde, adipaldehyde, 2-hydroxyhexanedial, phthalaldehyde, 1,4,benzenediacetaldehyde, 4,4(ethylenedioxy)dibenzaldehyde, and 2,6-naphthalene dicarbaldehyde. Most preferred are glutaraldehyde and adipaldehyde.

Suitable epoxide-functional materials include aliphatic, cycloaliphatic and glycidyl ether diepoxides. Most preferred are the diepoxides based upon bis-phenol A and bis-phenol F.

Useful acrylic-functional materials are preferably diacrylates and a wide variety of such materials may be successfully employed in the invention.

The organoborane amine complex may be readily prepared using known techniques. Typically, the amine is combined with the organoborane in an inert atmosphere (e.g., a glovebox flushed with nitrogen to an environment having less than 100 ppm oxygen) with slow stirring. The organoborane can be added from a pressure equalizing dropping funnel to a flask into which the amine has been previously weighed. An exotherm is often observed and cooling of the mixture is, therefore, recommended. Addition of the organoborane may be moderated to control the exotherm and in the event of any fuming. If the ingredients have a high vapor pressure, it is desirable to keep the reaction temperature below about 70° to 80° C. Once the materials have been well mixed the complex is permitted to cool to room temperature. No special storage conditions are required although it is preferred that the complex be kept in a capped vessel in a cool, dark location. A crystalline mass of the complex can be heated (e.g., to about 55° C.) with an oil bath and outside of the nitrogen environment to liquify the complex and facilitate its transfer to the storage vial, which can be flushed with nitrogen.

The organoborane amine complex is employed in an effective amount, which is an amount large enough to permit acrylic monomer polymerization to readily occur to obtain an acrylic polymer of high enough molecular weight for the desired end use. If the amount of organoborane amine complex is too low, then the polymerization may be incomplete or, in the case of adhesives, the resulting composition may have poor adhesion. On the other hand, if the amount of organoborane amine complex is too high, then the polymerization may proceed too rapidly to allow for effective mixing and use of the resulting composition.

Large amounts of complex could also lead to the generation of large volumes of borane, which, in the case of an adhesive, could weaken the bondline. The useful rate of polymerization will depend in part on the method of applying the composition to a substrate. Thus, a faster rate of polymerization may be accommodated by using a high speed automated industrial adhesive applicator rather than by applying the composition with a hand applicator or by manually mixing the composition.

Within these parameters, an effective amount of the organoborane amine complex is an amount that preferably provides about 0.03 to 1.5 weight % boron, more preferably about 0.08 to 0.5 weight % boron, most preferably about 0.1 to 0.3 weight % boron. The weight % of boron in a composition is based on the total weight of the composition, less fillers, non-reactive diluents, and other non-reactive materials. Thus, the acrylic group-containing materials, the aziridine-functional material, and organic thickener, (e.g., poly(methyl methacrylate) or core-shell polymer), if present, are included, but ingredients lacking abstractable hydrogen atoms or unsaturation are not. The weight % of boron in the composition may be calculated by the following equation:

$$\frac{(\text{weight of complex in the composition}) \times (\text{weight \% of boron in the complex})}{(\text{Total weight of the composition less non-reactive components})}.$$

Quite advantageously, the organoborane amine complex is carried by (e.g., dissolved in or diluted by) an aziridine-functional material or a blend of two or more different aziridine-functional materials. The aziridine-functional material should not be reactive toward, coordinate or complex the amine portion of the complex and functions as an extender for the complex. The aziridine-functional material also increases the spontaneous combustion temperature of the curative mixture (organoborane amine complex and aziridine-functional material).

The aziridine-functional material should be soluble in acrylic monomers included in the composition. By "soluble" it is meant that no evidence of gross phase separation at room temperature is visible to the unaided eye. Similarly, the organoborane amine complex should be soluble in the aziridine-functional material, although slightly warming a mixture of the complex and the aziridine-functional material may be helpful in forming a solution of the two at room temperature. Preferably the aziridine-functional material is a liquid at or near room temperature (i.e., within about 10° C. of 20–22° C.) or forms a liquid solution with the organoborane amine complex at or near room temperature. Quite advantageously, substantial amounts (e.g., more than 75% by weight, up to 100% by weight) of the complex may be dissolved in the aziridine-functional material, which facilitates the provision of two-part adhesives that can be combined in a commercially useful mix ratio.

The aziridine-functional material may also function as a reactive extender if the composition includes an ingredient that undergoes a ring-opening reaction with the aziridine functionality so as to permit the aziridine-functional material to react therewith or to polymerize with other constituents of the system. Advantageously, the amine reactive compound can also react with the aziridine-functional material so as to yield a 100% reactive system. Desirably, this can reduce the level of low molecular weight migratory components in the polymerizable composition which, in the case of an adhesive, could bloom to the surface of a bonded interface and reduce the strength of the adhesive bond. In this regard, amine-reactive compounds with free-radically polymerizable groups are especially preferred as they enable the resulting reaction product with the aziridine-functional material to act as a crosslinking agent.

An "aziridine-functional material" refers to an organic compound having at least one aziridine ring or group,

the carbon atom(s) of which may be optionally substituted by short chain alkyl groups, e.g., groups having 1 to 10 carbon atoms and preferably methyl, ethyl or propyl, so as to form, for example, methyl, ethyl or propyl aziridine moieties.

Mono-functional aziridines in which a single aziridine group is a substituent in an alkyl, aryl, alkylaryl, acyl, or aroryl radical (which optionally may be substituted with other moieties that do not react with the organoborane amine complex or the aziridine functionality such as amino and hydroxyl groups) may be employed in the invention. Particular examples of suitable mono-functional aziridines include N-ethyl aziridine, N-(2-cyanoethyl)aziridine, N-butyl aziridine, iso-butyl aziridine, 2-aziridinyl ethanol, 1-aziridinyl ethanol, 1-iso-butyryl aziridine, and 1-butyryl aziridine.

While mono-functional aziridines are useful, polyfunctional aziridines (sometimes referred to herein as "polyaziridines"; i.e., having more than aziridine group) are more preferred as they promote the in situ generation of a crosslinking agent, as described more fully hereinbelow. Of the various polyaziridines, those which are tri-functional are especially useful.

Suitable polyaziridines may be generally represented by the structure

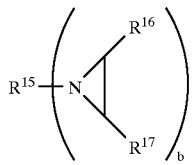

wherein $R^{15}$ is a polyvalent radical, $R^{16}$ and $R^{17}$ are independently selected from the group consisting of hydrogen and short chain alkyl groups (e.g., 1 to 10, more preferably, 1 to 3 carbon atoms), and b is a number greater than or equal to 2. In more preferred embodiments, $R^{16}$ and $R^{17}$ are independently hydrogen or methyl, and b=3. Substituents that will hinder the room temperature reactivity of the aziridine-functional material should be avoided.

The polyvalent radical, $R^{15}$, may be any aryl, alkyl, or alkylaryl radical or phosphine oxide group, and those of larger molecular weight (e.g., greater than or equal to about 300) can desirably reduce the volatility of the aziridine-functional material. Particularly preferred examples of $R^{15}$ include trimethylol propane triacrylate, and pentaerythritol triacrylate subsequently reacted with aziridine or methylaziridine, so as to form tris-aziridine and tris-methylaziridine of trimethylol propane triacrylate, and tris-aziridine and tris-methylaziridine of pentaerythritol triacrylate.

Examples of other useful tri-functional aziridines include: tris-(2-methyl-1-aziridinyl)phosphine oxide), tris-(1-aziridinyl) phosphine sulfide, tris-(1-aziridinyl) phosphine oxide, trimethylolpropane tris-(2-methyl-1-aziridinepropionate), trimethylolpropane tris-(aziridinyl propionate), tetramethylolmethane tris (aziridinylpropionate), pentaerythritol tris[3-(1-aziridinyl) propionate)], triethylenemelamine, and triethylenethiophosphoramide.

Other polyfunctional aziridines include difunctional aziridines such as: N,N'-toluene-2,4-bis(1-aziridinecarboxamide), N,N-hexamethylene-1,6-bis(1-aziridinecarboxamide), N,N'-hexamethylene-bis-1,6-bis-(2-methyl-1-aziridinecarboxamide), 1,6-hexanediol bis-(aziridinyl propionate), and 1,6-hexanediol bis-(2-methyl aziridinyl propionate).

Examples of useful, commercially available polyaziridines include CX-100 (from Zeneca Resins), XAMA-7 (from EIT, Inc.), and MAPO (tris[1-(2-methyl)aziridinyl] phosphine oxide (from Aceto Corp).

The aziridine-functional material is used in an effective amount. If the aziridine-functional material is intended to react with the amine-reactive compound, then the amount of aziridine-functional material is preferably selected such that the number of equivalents of amine-reactive compound is stoichiometric with the number of equivalents of amine functionality in the complex plus the number of equivalents of aziridine functionality in the composition. If the aziridine-functional material is not intended to react with the amine-reactive compound, then the aziridine-functional material can be used in any amount that does not materially adversely affect the ultimate properties of the polymerized composition (for example, adhesion), depending on the intended use. Generally, this is an amount of not more than about 50%, preferably not more than about 25%, more preferably not more than about 10%, based on the total weight of the composition.

As noted above, the organoborane amine complexes of the invention are especially useful as polymerization initiators, in particular, for initiating the polymerization of acrylic monomers. In such cases, the organoborane amine complexes form one component of a polymerization initiator system that comprises and, more preferably, consists essentially of an effective amount of the organoborane amine complex and an effective amount of a compound that is reactive with amine for liberating organoborane so as to initiate polymerization.

The amine reactive compound liberates organoborane by reacting with the amine, thereby removing the organoborane from chemical attachment with the amine. A wide variety of materials may be used to provide the amine reactive compound. Desirable amine reactive compounds are those materials that can readily form reaction products with amines at or below (and, more preferably, at) room temperature (about 20° to 22° C.) so as to provide a composition such as an adhesive that can be easily used and cured under ambient conditions. Even more desired as amine reactive compounds are those materials that can participate in a nucleophilic ring-opening reaction with the aziridine substituent(s) in the aziridine-functional material. General classes of useful amine reactive compounds include acids, anhydrides and aldehydes. Isocyanate, acid chloride, sulfonyl chloride, and the like such as isophorone diisoyanate, toluene diisocyanate and methacryloyl chloride may also be used but are less preferred because they require scrupulous drying of monomer mixtures containing these ingredients so as to preclude undesirable, premature reaction with moisture.

Acids are a preferred amine reactive compound. Any acid that can liberate the organoborane by salting the amine group may be employed. Useful acids include Lewis acids (e.g., $SnC_4$, $TiCl_4$ and the like) and Bronsted acids such as those having the general formula $R^{18}$—COOH, where $R^{18}$ is hydrogen, an alkenyl group of 1 to 8 and preferably 1 to 4 carbon atoms, or an aryl group of 6 to 10, preferably 6 to 8 carbon atoms. The alkenyl groups may comprise a straight chain or they may be branched. They may be saturated or unsaturated. The aryl groups may contain substituents such as alkyl, alkoxy or halogen moieties. Illustrative acids of this type include acrylic acid, methacrylic acid, acetic acid, benzoic acid, and p-methoxybenzoic acid. Other useful Bronsted acids include HCl, $H_2SO_4$, $H_3PO_4$, phosphonic acid, phosphinic acid, silicic acid, and the like.

As noted above, vinyl unsaturated acids such as acrylic acid and methacrylic acid are preferred amine reactive compounds due, in part, to their reaction with the aziridine-functional material so as to provide an in situ generated acrylic crosslinking agent which may be polymerizable or non-polymerizable with respect to the acrylic monomers. For this reason, polyaziridines (especially those which are at least trifinctional) are preferred and can perform as a reactive extender for the organoborane amine complex.

Also preferred as the amine reactive compound are materials having at least one anhydride group, such materials preferably having one of the following structures:

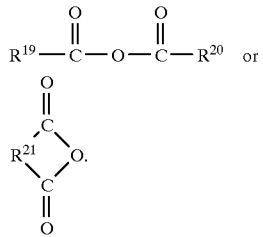

$R^{19}$ and $R^{20}$ are organic radicals which independently may be aliphatic, including straight- and branched-chain arrangements that may be saturated or unsaturated, cycloaliphatic, or aromatic. Preferred aliphatic groups comprise 1 to 17 carbon atoms, more preferably 2 to 9 carbon atoms. Preferred aromatic groups include benzene which may be substituted with 1 to 4 carbon atom aliphatic groups.

$R^{21}$ is a divalent organic radical that completes a cyclic structure with the anhydride group to form, for example, a 5 or 6-membered ring. $R^{21}$ may be substituted with aliphatic, cycloaliphatic or aromatic groups, preferably aliphatic groups comprising 1 to 12, more preferably 1 to 4 carbon atoms. $R^{21}$ may also contain heteroatoms such as oxygen or nitrogen provided that any heteroatom is not adjacent to the anhydride functionality. $R^{21}$ may also be part of a cycloaliphatic or aromatic fused ring structure, either of which may be optionally substituted with aliphatic groups.

The presence of a free-radically polymerizable group in the anhydride-functional amine reactive compound may permit the same to polymerize with the acrylic monomers.

If the anhydride-functional material includes more than one free-radically polymerizable group, it may function as a crosslinking agent. The anhydride, once it reacts with the amine in the complex, can also react with a polyaziridine leading to a crosslinked mixture. In addition, in order to mediate premature gellation of the polymerizing mixture, saturated anhydrides may be used singly or in combination with the vinyl unsaturated anhydrides.

Aldehydes useful as the amine-reactive compound have the formula: $R^{22}$—$(CHO)_x$ where $R^{22}$ is an alkyl group of 1 to 10 carbon atoms, preferably 1 to 4, or an aryl group having 6 to 10 carbon atoms, preferably 6 to 8, and x is 1 to 2, preferably 1. In this formula, the alkyl groups may be straight or branch-chained, and may contain substituents such as halogen, hydroxy and alkoxy. The aryl groups may contain substituents such as halogen, hydroxy, alkoxy, alkyl and nitro. The preferred $R^{22}$ group is aryl. Illustrative examples of compounds of this type include, benzaldehyde, o-, m- and p-nitrobenzaldehyde, 2,4-dichlorobenzaldehyde, p-tolylaldehyde and 3-methoxy-4 hydroxybenzaldehyde. Blocked aldehydes such as acetals may also be used in this invention.

The amine reactive compound is employed in an effective amount; that is, an amount effective to promote polymerization by liberating organoborane from the complex, and if desired, reacting with the aziridine-functional material to generate a crosslinking agent, but without materially adversely affecting the properties of the ultimate polymerized composition. Larger amounts of amine reactive compound may permit the polymerization to proceed too quickly and, in the case of adhesives, the resulting materials may demonstrate inadequate adhesion to low energy surfaces. Undesirable side reactions that adversely affect the performance properties of the polymerized composition, or an undesirably high level of extractables in the polymerized composition may also result from using large amounts of amine reactive compound. On the other hand, an excess of certain amine reactive compounds may promote adhesion to higher energy surfaces. If small amounts of amine reactive compound are employed, the rate of polymerization may be too slow and the monomers that are being polymerized may not adequately increase in molecular weight and sufficient amounts of an in situ generated crosslinking agent may not form. However, a reduced amount of amine reactive compound may be helpful in slowing the rate of polymerization if it is otherwise too fast.

Within these parameters, the amine reactive compound may be provided in an amount wherein the number of equivalents of amine reactive groups is as much as twice stoichiometric with the number of amine groups in the organoborane amine complex. However, it is much more preferred that the number of equivalents of amine reactive groups be stoichiometric with the number of amine groups in the organoborane amine complex. If the amine reactive compound is intended to react with the aziridine-functional material, then additional amine reactive compound should be provided, the number of equivalents of amine reactive groups in the additional amount preferably being at least stoichiometric with the number of aziridine groups in the aziridine-functional material.

The organoborane amine complex initiator systems of the invention are especially useful in polymerizing acrylic monomers, particularly for making polymerizable adhesives. By "acrylic monomer" is meant polymerizable monomers having one or more acrylic or substituted acrylic moieties, chemical groups or functionality; that is, groups having the general structure

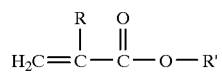

wherein R is hydrogen or an organic radical and R' is an organic radical. Where R and R' are organic radicals, they may be the same or they may be different. Blends of acrylic monomers may also be used. The polymerizable acrylic monomer may be monofunctional, polyfunctional or a combination thereof.

The most useful monomers are monofunctional acrylate and methacrylate esters and substituted derivatives thereof such as hydroxy, amide, cyano, chloro, and silane derivatives as well as blends of substituted and unsubstituted monofunctional acrylate and methacrylate esters. Particularly preferred monomers include lower molecular weight methacrylate esters such as methyl methacrylate, ethyl methacrylate, methoxy ethyl methacrylate, hydroxyethyl methacrylate, hydroxypropyl methacrylate, cyclohexyl methacrylate, tetrahydrofurfuryl methacrylate, and blends thereof.

Both acrylate esters and higher molecular weight methacrylate esters are less preferred for use alone, but can be especially usefully employed as modifying monomers with predominating amounts of lower molecular weight methacrylate esters so as to, for example, enhance the softness or flexibility of the ultimate adhesive composition. Examples of such acrylate esters and higher molecular weight methacrylate esters include methyl acrylate, ethyl acrylate, isobornyl methacrylate, hydroxypropyl acrylate, butyl acrylate, n-octyl acrylate, 2-ethylhexyl acrylate, 2-ethylhexyl methacrylate, decyl methacrylate, dodecyl methacrylate, tert-butyl methacrylate, acrylamide, N-methyl acrylamide, diacetone acrylamide, N-tert-butyl acrylamide, N-tert-octyl acrylamide, N-butoxyacrylamide, gamma-methacryloxypropyl trimethoxysilane, 2-cyanoethyl acrylate, 3-cyanopropyl acrylate, tetrahydrofurfuryl chloroacrylate, glycidyl acrylate, glycidyl methacrylate, and the like.

Particularly preferred are blends of any of the lower molecular weight alkyl methacrylate esters described above with alkyl acrylates having 4 to 10 carbon atoms in the alkyl group, such as blends of methyl methacrylate and butylacrylate. Polymerizable compositions of this type may broadly comprise, based on the total weight of the composition, about 2 to 40 wt. % of the alkyl acrylate and, correspondingly, about 60 to 98 wt. % of the alkyl methacrylate.

Another class of polymerizable monomers that are especially useful as modifiers, such as for improving the creep resistance or temperature resistance of the ultimate composition, corresponds to the general formula:

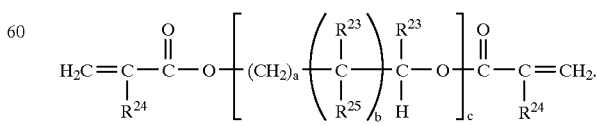

$R^{23}$ may be selected from the group consisting of hydrogen methyl, ethyl, and

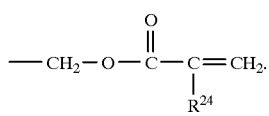

$R^{24}$ may be selected from the group consisting of hydrogen, chlorine, methyl and ethyl. $R^{25}$ may be selected from the group consisting of hydrogen, and

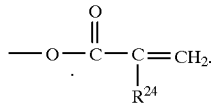

The value of a is an integer greater than or equal to 1, more preferably, from 1 to about 8, and most preferably from 1 to 4. The integral value of b is greater than or equal to 1, more preferably, from 1 to about 20. The value of c is 0 or 1.

Other acrylic monomers useful as modifying monomers, include ethylene glycol dimethacrylate, ethylene glycol diacrylate, polyethylene glycol diacrylate, tetraethylene glycol dimethacrylate, diglycerol diacrylate, diethylene glycol dimethacrylate, pentaerythritol triacrylate, trimethylolpropane trimethacrylate, as well as other polyether diacrylates and dimethacrylates.

Other polymerizable monomers that are useful in the invention, particularly as modifying monomers, have the general formula:

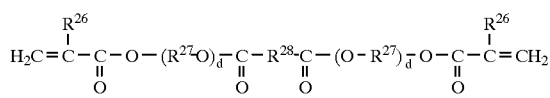

$R^{26}$ may be hydrogen, chlorine, methyl or ethyl; $R^{27}$ may be an alkylene group with 2 to 6 carbon atoms; and $R^{28}$ is $(CH_2)_e$ in which e is an integer of 0 to 8, or one of the following:

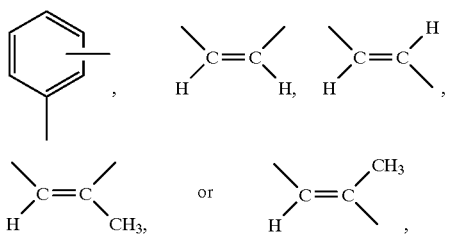

the phenyl group being substitutable at any one of the ortho, meta or para positions. The value of d is an integer of 1 to 4.

Typical monomers of this class include dimethacrylate of bis(ethylene glycol) adipate, dimethacrylate of bis(ethylene glycol) maleate, dimethacrylate of bis(ethylene glycol) phthalate, dimethacrylate of bis(tetraethylene glycol) phthalate, dimethacrylate of bis(tetraethylene glycol) sebacate, dimethacrylates of bis(tetraethylene glycol) maleate, and the diacrylates and chloroacrylates corresponding to the dimethacrylates, and the like.

Also useful as modifying agents are monomers that are isocyanate-hydroxyacrylate or isocyanate-aminoacrylate reaction products. These may be characterized as acrylate terminated polyurethanes and polyureides or polyureas.

Such monomers have the following general formula:

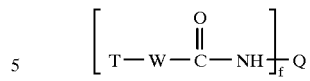

where W is selected from the group consisting of —O— and

$R^{29}$ is selected from the group consisting of hydrogen and lower alkyl groups (e.g., 1 to 7 carbon atoms). T is the organic residue of an active hydrogen-containing acrylic ester, the active hydrogen having been removed and the ester being hydroxy or amino substituted on the alkyl portion thereof (including the methyl, ethyl and chlorine homologs). The integral value of f is from 1 to 6. Q is a mono- or polyvalent organic radical selected from the group consisting of alkyl, alkylene, alkenyl, cycloalkyl, cycloalkylene, aryl, aralkyl, alkaryl, poly(oxyalkylene), poly(carboalkoxyalkylene), and heterocyclic radicals, both substituted and unsubstituted.

Typical monomers of this class include the reaction product of mono- or polyisocyanates, for example, toluene diisocyanate, with an acrylate ester containing a hydroxy or an amino group in the non-acrylate portion thereof, for example, hydroxyethyl methacrylate.

The compositions may further comprise a variety of optional additives. One particularly useful additive is a thickener such as medium (about 100,000) molecular weight polymethyl methacrylate which may be incorporated in an amount of about 10 to 40 weight %, based on the total weight of the composition. Thickeners may be employed to increase the viscosity of the composition to a more easily room temperature applied viscous syrup-like consistency.

Another particularly useful additive is an elastomeric material. These materials can improve the fracture toughness of compositions made therewith which can be beneficial when, for example, bonding stiff, high yield strength materials such as metal substrates that do not mechanically absorb energy as easily as other materials, such as flexible polymeric substrates. Such additives can be incorporated in an amount of about 5% to 35% by weight, based on the total weight of the composition.

Certain graft copolymer resins such as particles that comprise rubber or rubber-like cores or networks that are surrounded by relatively hard shells, these materials often being referred to as "core-shell" polymers, are particularly useful elastomeric additives. Most preferred are the acrylonitrile-butadiene-styrene graft copolymers. In addition to improving the fracture toughness of the composition, core-shell polymers can also impart enhanced spreading and flow properties to the uncured composition. These enhanced properties may be manifested by a reduced tendency for the composition to leave an undesirable "string" upon dispensing from a syringe-type applicator, or sag or slump after having been applied to a vertical surface. Use of more than about 10% of a core-shell polymer additive is desirable for achieving improved sag-slump resistance.

Another useful adjuvant is an acrylic monomer crosslinking agent. Acrylic monomer crosslinking agents can be used to enhance the solvent resistance of the adhesive bond, although certain compositions of the invention have good solvent resistance even in the absence of externally added acrylic monomer crosslinking agents. As noted above, polyaziridines can function as crosslinking agents for acrylic monomers in the presence of a free-radically reactive, aziridine ring-opening compound. Their efficacy in this regard is enhanced if the amine reactive compound is an anhydride that contains a free-radically polymerizable group or a vinyl-unsaturated acid such as acrylic or methacrylic acid. Thus, the extent to which other crosslinking agents may be used will be influenced by the properties desired in the ultimate, cured composition, as well as the type and amount of both the aziridine-functional material and the amine reactive compound.

The other acrylic monomer crosslinking agents are typically employed in an amount of about 0.2 to 10 weight % based on the total weight of the composition, and those which are useful include the various diacrylates and dimethacrylates referred to above as possible acrylic modifying monomers as well as other materials. Particular examples of suitable acrylic monomer crosslinking agents include ethylene glycol dimethacrylate, ethylene glycol diacrylate, triethyleneglycol dimethacrylate, diethylene glycol bismethacryloxy carbonate, polyethylene glycol diacrylate, tetraethylene glycol dimethacrylate, diglycerol diacrylate, diethylene glycol dimethacrylate, pentaerythritol triacrylate, trimethylolpropane trimethacrylate, as well as other polyether diacrylates and dimethacrylates.

Peroxides may be optionally included (typically in an amount of about 2% by weight or less, based on the total weight of the acrylate and methacrylate components) for example, to adjust the speed at which the compositions polymerize or to complete the acrylic monomer polymerization.

Small amounts of inhibitors such as hydroquinone may be used, for example, to prevent or reduce degradation of the acrylic monomers during storage. Inhibitors may be added in an amount that does not materially reduce the rate of polymerization or the ultimate properties of an adhesive or other composition made therewith, typically about 100–10,000 ppm based on the weight of the polymerizable monomers. Other possible additives include non-reactive colorants, fillers (e.g., carbon black), etc.

The various optional additives are employed in an amount that does not significantly adversely affect the polymerization process or the desired properties of compositions made therewith.

Polymerizable adhesive compositions according to the invention may be used in a wide variety of ways, including as sealants, coatings, and injection molding resins. They may also be used as matrix resins in conjunction with glass and metal fiber mats such as in resin transfer molding operations. They may further be used as encapsulants and potting compounds such as in the manufacture of electrical components, printed circuit boards and the like. Quite desirably, they provide polymerizable adhesive compositions that can bond a diverse myriad of substrates, including polymers, wood, ceramics, concrete, and primed metals.

Polymerizable compositions of the invention are especially useful for adhesively bonding low surface energy plastic or polymeric substrates that historically have been very difficult to bond without using complicated surface preparation techniques, priming, etc. By low surface energy substrates is meant materials that have a surface energy of less than 45 mJ/m$^2$, more typically less than 40 mJ/m$^2$ or less than 35 mJ/m$^2$. Included among such materials are polyethylene, polypropylene, acrylonitrile-butadiene-styrene, and fluorinated polymers such as polytetrafluoroethylene (TEFLON) which has a surface energy of less than 20 mJ/m$^2$. (The expression "surface energy" is often used synonymously with "critical wetting tension" by others.) Other polymers of somewhat higher surface energy that may be usefully bonded with the compositions of the invention include polycarbonate, polymethylmethacrylate, and polyvinylchloride.

The polymerizable compositions of the invention can be easily used as two-part adhesives. The acrylic monomers are blended as would normally be done when working with such materials and, advantageously, scrupulous drying of the reactants may be avoided if there are no isocyanate-functional materials. The amine-reactive compound is usually included in this blend so as to separate it from the organoborane amine complex, thus providing one part of the two-part composition. The organoborane amine complex and aziridine-functional material provide the second part of the composition. The first and second parts are combined shortly before it is desired to use the composition.

For a two-part adhesive such as those of the invention to be most easily used in commercial and industrial environments, the ratio at which the two parts are combined should be a convenient whole number. This facilitates application of the adhesive with conventional, commercially available dispensers. Such dispensers are shown in U.S. Pat. Nos. 4,538,920 and 5,082,147 and are available from Conprotec, Inc. (Salem, N.H.) under the tradename "Mixpac" and are sometimes described as dual syringe-type applicators.

Typically, these dispensers use a pair of tubular receptacles arranged side-by-side with each tube being intended to receive one of the two parts of the adhesive. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two parts. The blended adhesive is extruded from the mixing chamber onto a substrate. Once the tubes have been emptied, they can be replaced with fresh tubes and the application process continued.

The ratio at which the two parts of the adhesive are combined is controlled by the diameter of the tubes. (Each plunger is sized to be received within a tube of fixed diameter, and the plungers are advanced into the tubes at the same speed.) A single dispenser is often intended for use with a variety of different two-part adhesives and the plungers are sized to deliver the two parts of the adhesive at a convenient mix ratio. Some common mix ratios are 1:1, 1:2, 1:4 and 1:10.

If the two parts of the adhesive are combined in an odd mix ratio (e.g. 3.5:100), then the ultimate user would probably manually weigh the two parts of the adhesive. Thus, for best commercial and industrial utility and for ease of use with currently available dispensing equipment, the two parts of the adhesive should be capable of being combined in a common, whole number mix ratio such as 10:1 or less, more preferably 1:4, 1:3, 1:2 or 1:1.

Adhesive compositions of the invention are uniquely suited for use with conventional, commercially available dispensing equipment for two-part adhesives. The unique solubility of the organoborane amine complex in the aziridine-functional material can be advantageously used to modify the mix ratio of the two parts of the adhesive composition to the most commercially important whole number values; e.g., 1:10, 1:4, 1:3, 1:2 or 1:1. Moreover, the use of a polyaziridine, especially with certain amine reactive compounds such as acrylic or methacrylic acid, can result in the in situ generation of an acrylic crosslinking agent that can impart desirable properties to the cured composition such as improved cohesive strength, enhanced solvent resistance, and better hydrolytic stability, especially at elevated temperatures.

Once the two parts have been combined, the composition should be used quickly, as the useful pot life may be short depending upon the acrylic monomer mix, the amount of complex, the temperature at which the bonding is to be performed, the presence or absence of crosslinking agents, and the type of aziridine-functional material.

The polymerizable composition can be easily applied and cured at room temperature. Typically, it is applied to one or both substrates and then the substrates are joined together with pressure to force excess composition out of the bond line. This also has the advantage of displacing composition that has been exposed to air and that may have begun to oxidize. In general, the bonds should be made shortly after the composition has been applied, preferably within about 10 minutes. The typical bond line thickness is about 0.1 to 0.3 mm. The bonding process can easily be carried out at room temperature and to improve the degree of polymerization it is desirable to keep the temperature below about 40° C., preferably below 30° C., and most preferably below about 25° C.

The bonds will cure to a reasonable green strength to permit handling of the bonded components within about 6 to 7 hours. Full strength will be reached in about 24 hours under ambient conditions; post-curing with heat (typically about 80° C.) may be used if desired. Even more rapid strength build-up is facilitated by the inclusion of crosslinking agents or cyclic anhydride-functional or vinyl unsaturated anhydride-functional amine reactive compounds in the polymerizing mixture.

The invention will be more fully appreciated with reference to the following nonlimiting examples in which the compositions are given as either weight percents (weight %), based on the total weight of either the monomer mixture or the curative mixture which are nominally 100 weight %. The weight % values (except for boron) are reported to three significant digits. Dimensions in English units are nominal and conversion to metric units is approximate.

Various tradenames and abbreviations used in the examples are defined according to the following schedule:

| Abbreviation or Tradename | Description |
| --- | --- |
| Ac-Anh | Acetic acid anhydride |
| BA | n-butyl acrylate |
| B-360 | Blendex ™360 core-shell rubber modifier from General Electric Specialty Chemicals |
| cm | Centimeter |
| Cx-100 | Tris-methyl aziridine of trimethylolpropane triacrylate from Zeneca Resins |
| 1,6-HDDA | 1,6-hexanediol diacrylate |
| HDPE | High density polyethylene |
| HEMA | Hydroxy ethyl methacrylate |
| HMDA | 1,6-hexanediamine |
| ICI2010 | Medium molecular weight PMMA Elvacite 2010, from ICI Acrylics |
| in. | Inch |
| Kg | Kilogram |
| lbs. | Pounds |
| Lo-PMMA | Low molecular weight poly (methyl methacrylate) from Aldrich Chemical Co. Catalog #37,691-4 |
| MAA | Methacrylic acid |
| MA-Anh | Methacrylic acid anhydride |
| mm | Millimeter |
| MMA | Methylmethacrylate |

-continued

| Abbreviation or Tradename | Description |
| --- | --- |
| Med-PMMA | 101,000 molecular weight poly (methyl methacrylate-co-ethyl acrylate) with less than 5% ethylacrylate from Aldrich Chemical Company |
| $\mu$m | Micron |
| P25 | Fumed titania from Degussa Corp. |
| PMMA | VSNA-100 from ATO-Haas |
| PP | Polypropylene |
| TEB | Triethylborane |
| TEB*HMDA | Complex between 2 moles of triethylborane and 1 mole of hexamethylene diamine |
| TS-720 | Silane treated fumed silica from Cabot Corp. |
| XAMA-7 | Tris-aziridine of pentaerythritol triacrylate from EIT Inc. (Lake Wylie, SC) |

Preparation of Monomer Mixtures

More specific details about the monomer mixtures used in the examples are given below in conjunction with the individual examples. In general, however, the monomer mixtures were generated by weighing methyl methacrylate, n-butyl acrylate, methacrylic acid or other amine reactive compound, and poly(methyl methacrylate thickener (if included) into a bottle. The bottle was sealed, placed on a roller/mixer, and heated under an infrared heat lamp that rendered the bottle warm but not hot to the touch until a solution was obtained. Usually a clear, colorless moderately viscous liquid resulted. If a core-shell toughener was included, it was added to the previously prepared mixture, and mixed in a high speed blender until an opaque or pearlescent but homogenous (no obvious lumps) dispersion was obtained. External cooling was supplied as needed to moderate the temperature of the mixtures. In the tables, monomer ratios are given as a weight % of the monomer mixture.

Preparation of Curative Mixtures

More specific details about the curative mixtures used in the examples are given below in conjunction with the individual examples. In general, however, curative mixtures were made by dissolving the organoborane amine complex (1:1 primary nitrogen atom to boron atom ratio unless noted otherwise) in the aziridine-functional material, using gentle heat as necessary to dissolve the complex. If a filler (e.g., silane treated fumed silica and/or fumed titania) was included as a thickener/thixotrope, it was added to the previously prepared mixture, and mixed in a high speed blender with external cooling supplied as need to regulate the temperature of the mixture.

Adhesive Mixing

The monomer and curative mixtures are designed to be packaged side-by-side in a dual syringe applicator used to store, mix and dispense two-part adhesives. This type of device keeps the two parts of the adhesive separated until use. When dispensed from the syringe, the two components pass through a static mixing tube attached to the end of the syringe and are intimately mixed. For purposes of the following examples and also for commercial reasons, the formulations of the present invention were designed to operate at a 10:1 or other even whole number monomer mixture:curative mixture ratio. Dual syringes that would provide this mix ratio were obtained from Conprotec, Inc. under the tradename "Mixpac." The larger compartment of the dual syringe was filled with the monomer mixture while the curative mixture was placed in the smaller compartment. Care was taken to remove any air which may have been introduced during the filling process. In some cases, the monomer mixture and curative mixture were weighed by means of an analytical balance. The two were then combined at a 10:1 by weight ratio and mixed by hand.

Lap Shear Strength Test Method

Examples that were subsequently evaluated to measure the lap shear strength of adhesive bonds made therewith were tested as described below.

More specifically, the test specimens used were similar to that described in ASTM D-1002 except that they were generated using finger panels of nominal dimensions 1 in.×4 in.×⅛ in. thick (2.5 cm×10.2 cm×0.3 cm thick). Short pieces of piano wire measuring 0.008 in. (200 μm) diameter were used as spacers to control the thickness of the adhesive bondline.

The adhesive composition was made by weighing a previously prepared monomer mixture into a vial that was capable of being sealed with a poly cap. A previously prepared curative mixture was then added, blended with the monomer mixture using a wooden stick, and the vial was sealed with the poly cap. In general, the addition of the curative mixture to the monomer mixture caused the blend to slightly exotherm and, in some cases, turn yellow. Alternatively, the mixed adhesive was dispensed with the dual syringe-type applicator described above.

A dab of the mixed adhesive was applied to each adherend and spread to make sure that a 1 in.×0.5 in. (2.5 cm×1.3 cm) area was covered at the end of each adherend. Two pieces of piano wire were placed into the adhesive on one adherend and the bond was closed. The bond was fixtured with two binder clips and allowed to cure at room temperature for 48 hours at which time the binder clips were removed.

Lap shear testing was done with three types of adherends: mechanical grade TEFLON, high density polyethylene (HDPE), and polypropylene (PP), as available from Cadillac Plastics Co. (Minneapolis, Minn.). Three adhesive bonds were made with each adherend and each adhesive combination. For each adhesive, the TEFLON was bonded first, then the high density polyethylene, and then the polypropylene.

After curing, the bonds were tested to failure using a tensile testing machine. The crosshead speed was 0.1 in./minute (2.5 mm/min.) and the tests were carried out at room temperature. The lap shear strengths are an average of three measurements and are reported in psi (pounds per square inch) to the nearest whole number.

Bonds were visually inspected after being loaded to failure to determine the failure mode. Failure of the adherends is the most preferred although cohesive failure of the adhesive composition evidences a useful formulation. Failure modes are reported in the examples based on a series of coded abbreviations which may be interpreted as follows:

| Abbreviation | Failure Mode |
| --- | --- |
| a | Good filet adhesion |
| b | One or more bonds stretched to yield of the adherend without failure |
| c | Mixed mode failure |
| d | Failure of the adherend |
| e | Cohesive failure within the adhesive |
| f | Adhesion failure of the adhesive |

-continued

| Abbreviation | Failure Mode |
| --- | --- |
| g | Incomplete wetting; puddling of the adhesive |
| h | Shocky (peel) |
| i | Smooth, brittle (peel) |
| j | Smooth, tough (peel) |

Several adhesive formulas were also tested using aluminum adherends and following ASTM D-1002, supplemented by the use of piano wire spacers. The aluminum alloy was bare 2024-T3, the surface of which was prepared using an optimized FPL etch (see A. V. Pocius, *J. Adhesion*, 39, 101 (1992), experimental section). The aluminum plates had nominal dimensions of 4 in.×7 in.×0.063 in. (10.2 cm×17.8 cm×0.2 cm). The adhesive was applied to the long edge of both adherends. The adherends were then mated providing a 0.5 in. (1.3 cm) overlap. 0.008 in. (200 μm) diameter piano wire had been placed in the bond before mating. The edges of the bonded area were taped with 0.5 in. (1.3 cm) wide adhesive tape. The bonded aluminum plates were placed between 14 lbs. (6.3 kg) steel plates to fixture the bonds as well as to provide pressure to optimize spreading of the adhesive during cure. The adhesive was allowed to cure for 1 week at which point the bond was cut into 1 in. (2.5 cm) wide strips. The strips were tested at 0.1 in./min. (2.5 mm/min.) crosshead speed at room temperature using a tensile testing machine.

T-Peel Test Method

T-peel tests of adhesive formulations were done on plastic adherends following ASTM D-1876 but using adherends having smaller dimensions so as to preclude having to saw larger laminates to the desired size. The T-peel adherends were 1/16 in. (0.2 cm) thick, 6 in. (15.3 cm) long and 1 in. (2.5 cm) wide. The adhesive formulation was applied to both adherends but with no adhesive in an area of about 1 in. (2.5 cm) long at the end of each adherend. A piece of aluminum foil was placed in this region as a release material to provide a place in the assembly which could be opened easily. 0.008 in. (200 μm) diameter piano wire was placed in the adhesive bond as a spacer. The edges of the adhesive bond were fixtured with transparent adhesive tape. Two adhesive bonds of this type were placed between pieces of aluminum foil and that assemblage was placed between two pieces of cardboard which was then placed between two flat plates of steel which weighed 14 lbs. (6.3 kg) each. The adhesive was allowed to cure for 48 hours at room temperature. The end of the bond was opened and affixed into the jaws of a tensile testing machine. The crosshead speed was set at 0.5 in./minute (1.3 cm/min.). Higher crosshead speeds, in general, caused the adherend to fail. The peel force as a function of peeled distance was recorded graphically. The peel strength is the average force necessary to propagate the crack through the adhesive bond after the crack had stabilized (usually about 0.5 in. (1.3 cm) into the bond) and is measured in pounds per inch width (piw) as an average of three measurements.

Cohesive failure in the adhesive in the T-peel test is described as either: "smooth, tough" (high values of peel strength were obtained but the value was consistent over the entire length of the bond that was peeled); "smooth, brittle" (low values of peel strength were obtained but the value was consistent over the entire length of the bond that was peeled); or "shocky" (the measured force oscillated between high and low values over the length of the bond that was peeled). "Shocky" peel in structural adhesives usually means that the adhesive is in a border region between "smooth, tough" peel and "smooth, brittle" peel. Letter designations for these peel failure modes are noted in the table above. Values reported as a range indicate a shocky failure mode. The failure surfaces were examined and a description of the failure surface was recorded.

EXAMPLE 1

A monomer mix was prepared using 8.45 g MMA (37.6 wt %), 6.08 g BA (27.0 wt %), 6.73 g Med-PMMA (29.9 wt %), and 1.24 g MAA (5.5 wt %). A curative mix was generated using 5.17 g of CX-100 (68.9 wt %), and 2.33 g of TEB*HMDA (31.1 wt %). The monomer mixture and curative mixture were blended at a weight ratio of 10:1. Adhesive bonds were made with TEFLON, HDPE and PP. The results of lap shear tests were as follows:

TEFLON: 287 psi (mixed mode failure)

HDPE: 635 psi (cohesive failure in the adhesive) and

PP: 719 psi (adherend failure).

These results show that the aziridine-functional material can be used as an extender for the curative portion of a two-part acrylic adhesive composition.

EXAMPLE 2

Eight adhesive compositions were generated using two different aziridine-functional material as extenders for the TEB*HMDA curative as shown in Table 1. In Table 1, as in many of the other tables, information pertaining to the adhesive composition is provided in condensed form with the ingredients identified by the abbreviations shown in the previous schedule and with the relative amounts of each ingredient given parenthetically. Thus, the first entry in Table 1 describes an adhesive composition in which the monomer mixture comprised 43.3 wt. % methyl methacrylate (MMA), 18.7 wt. % n-butyl acrylate (BA), 2.67 wt. % 1,6-hexanediol diacrylate (1,6-HDDA), 5.37 wt. % methacrylic acid (MAA), 13.3 wt. % medium molecular weight poly (methyl methacrylate) (Med PMMA), and 16.6 wt. % Blendex B-360 core shell rubber modifier (B-360). The curative mixture comprised 66.3 wt. % aziridine-functional material (CX-100), 31.1 wt. % triethylborane* 1,6-hexane diamine (TEB* HMDA) complex, and 2.67 wt. % treated fumed silica (TS-720).

The adhesive compositions were then tested for lap shear strength and failure mode using the procedure described above and with the results shown below in Table 1. The failure mode of the bonds indicates that adhesion was promoted by the organoborane-initiated acrylic polymer. A commercially useful 10:1 mix ratio was obtained.

TABLE 1

| Adhesive Composition | | | Testing | | | | | |
|---|---|---|---|---|---|---|---|---|
| | | | TEFLON | | HDPE | | PP | |
| Monomer Mixture (Ratio) | Curative Mixture (Ratio) | Ratio of Monomer Mixture to Curative Mixture | Lap Shear Strength (psi) | Failure Mode | Lap Shear Strength (psi) | Failure Mode | Lap Shear Strength (psi) | Failure Mode |
| MMA/BA/ 1,6-HDDA/MAA/ Med PMMA/ B-360 (43.3/18.7/2.67/ 5.37/13.3/16.6) | CX-100/ TEB* HMDA/ TS-720 (66.3/31.1/ 2.67) | 10:1 | 408 | b | 799 | b | 993 | b,d |
| MMA/BA/ 1,6-HDDA/MAA/ Med PMMA/ B-360 (42.0/19.7/2.67/ 5.72/13.3/16.6) | CX-100/ TEB* HMDA/ TS-720 (66.4/30.9/ 2.67) | 10:1 | 217 | c,f | 588 | b,e,g | 581 | f,g |
| MMA/BA/ 1,6-HDDA/MAA/ Med PMMA/ B-360 (42.3/19.8/2.67/ 5.37/13.3/16.6) | XAMA-7/ TEB* HMDA/ TS-720 (76.4/20.0/ 2.67) | 10:1 | 104 | f,g | 775 | b,d | 492 | b,g |
| MMA/BA/ 1,6-HDDA/MAA/ Med PMMA/ B-360 (42.0/19.7/2.67/ 5.76/13.3/16.6) | XAMA-7/ TEB* HMDA/ TS-720 (76.4/20.8/ 2.67) | 10:1 | 56 | f,c | 781 | b,d | 732 | b,d |
| MMA/BA/ 1,6-HDDA/MAA/ Lo PMMA/ B-360 (43.3/18.7/2.67/ 5.37/13.3/16.6) | CX-100/ TEB* HMDA/ TS-720 (66.4/31.1/ 2.67) | 10:1 | 341 | b,f | 802 | b | 1002 | b |

TABLE 1-continued

| Adhesive Composition | | | Testing | | | | | |
|---|---|---|---|---|---|---|---|---|
| | | | TEFLON | | HDPE | | PP | |
| Monomer Mixture (Ratio) | Curative Mixture (Ratio) | Ratio of Monomer Mixture to Curative Mixture | Lap Shear Strength (psi) | Failure Mode | Lap Shear Strength (psi) | Failure Mode | Lap Shear Strength (psi) | Failure Mode |
| MMA/BA/ 1,6-HDDA/MAA/ Lo PMMA/ B-360 (42.0/19.7/2.67/ 5.72/13.3/16.6) | CX-100/ TEB* HMDA/ TS-720 (66.4/30.9/ 2.67) | 10:1 | 379 | f,b | 789 | b,d | 1011 | b |
| MMA/BA/ 1,6-HDDA/MAA/ Lo PMMA/ B-360 (42.3/19.8/2.67/ 5.37/13.3/16.6) | XAMA-7/ TEB* HMDA/ TS-720 (76.4/20.9/ 2.67) | 10.1 | 61 | f | 726 | b,d | 627 | d,e |
| MMA/BA/ 1,6-HDDA/MAA/ Lo PMMA/ B-360 (42.0/19.7/2.67/ 5.75/13.3/16.6) | CX-100/ TEB* HMDA/ TS-720 (76.5/20.8/ 2.67) | 10:1 | 170 | f | 791 | d | 880 | b,d |

EXAMPLE 3

A series of adhesive compositions according to the invention was prepared following the procedure described above and having the formulations shown below in Table 2. The data in Table 2 show the shear strength results using formulations wherein the monomer mixture was varied and the aziridine-functional material, CX-100, was the only extender used. The lap shear strength of the adhesive compositions was tested and the failure mode analyzed as described above and with the results shown in Table 2.

TABLE 2

| Adhesive Composition | | | Testing | | | | | |
|---|---|---|---|---|---|---|---|---|
| | | | TEFLON | | HDPE | | PP | |
| Monomer Mixture (Ratio) | Curative Mixture (Ratio) | Ratio of Monomer Mixture to Curative Mixture | Lap Shear Strength (psi) | Failure Mode | Lap Shear Strength (psi) | Failure Mode | Lap Shear Strength (psi) | Failure Mode |
| MMA/BA/ MAA/Med PMMA/B-360 (44.3/20.4/5.37/ 13.3/16.6) | CX-100/ TEB*HMDA/ TS-720 (65.6/31.8/ 2.67) | 10:1 | 359 | b | 786 | b | 1017 | b |
| MMA/BA/ MAA/Lo PMMA/B-360 (44.3/20.4/5.37/ 13.3/16.6) | CX-100/ TEB*HMDA/ TS-720 (65.6/31.8/ 2.67) | 10:1 | 352 | b,f | 794 | b | 1004 | b |
| MMA/BA/ MAA/B-360 (44.3/20.4/5.37/ 29.9) | CX-100/ TEB*HMDA/ TS-720 (65.6/31.8/ 2.67) | 10:1 | 319 | b | 787 | b,d | 1005 | b |
| MMA/BA/ MAA/Lo PMMA/B-360 (42.6/20.1/6.67/ 13.3/16.6) | CX-100/ TEB*HMDA/ TS-720 (65.6/31.8/ 2.67) | 10:1 | 365 | b | 791 | b | 1009 | b |
| MMA/BA/ MAA/Lo PMMA/B-360 (42.5/19.6/7.97/ 13.2/16.5) | CX-100/ TEB*HMDA/ TS-720 (65.6/31.8/ 2.67) | 10:1 | 333 | b,d | 779 | b,d | 1009 | b |

TABLE 2-continued

| | | Ratio of | TEFLON | | HDPE | | PP | |
|---|---|---|---|---|---|---|---|---|
| Monomer Mixture (Ratio) | Curative Mixture (Ratio) | Monomer Mixture to Curative Mixture | Lap Shear Strength (psi) | Failure Mode | Lap Shear Strength (psi) | Failure Mode | Lap Shear Strength (psi) | Failure Mode |
| MMA/BA/ MAA/1,6-HDDA/Lo PMMA/B-360 (43.4/20.0/1.33/ 5.37/13.3/16.6) | CX-100/ TEB*HMDA/ TS-720 (65.6/31.8/ 2.67) | 10:1 | 242 | f,b | 797 | b | 1005 | b |

In general, the bonds stretched to the yield of the adherend without failure. All of the formulations showed excellent lap shear strength.

strength (on aluminum) of the adhesive compositions were tested and the failure mode analyzed as described above and with the results shown in Table 3.

TABLE 3

| Adhesive Composition | | | Testing | | | | | |
|---|---|---|---|---|---|---|---|---|
| | | Ratio of | TEFLON | | HDPE | | Aluminum | |
| Monomer Mixture (Ratio) | Curative Mixture (Ratio) | Monomer Mixture to Curative Mixture | T-Peel Strength (piw) | Failure Mode | T-Peel Strength (piw) | Failure Mode | Lap Shear Strength (psi) | Failure Mode |
| MMA/BA/ MAA/Med PMMA/B-360 (44.3/20.4/5.37/ 13.3/16.6) | CX-100/ TEB*HMDA/ TS-720 (65.5/3 1.8/ 2.67) | 10:1 | 5,15 | f,h,i | 13 | e,h | 3587 | c |
| MMA/BA/ MAA/Lo PMMA/B-360 (44.3/20.4/5.37/ 13.3/16.6) | CX-100/ TEB*HMDA/ TS-720 (65.5/31.8/ 2.67) | 10:1 | 2,7 | f,i | 21,22 | e,h | 3702 | c |
| MMA/BA/ MAA/B-360 (44.3/20.4/5.37/ 29.9) | CX-100/ TEB*HMDA/ TS-720 (65.5/31.8/ 2.67) | 10:1 | 23 | e,h | 31,32 | ej | 2730 | e |
| MMA/BA/ MAA/Lo PMMA/B-360 (42.6/20.1/6.67/ 13.3/16.6) | CX-100/ TEB*HMDA/ TS-720 (65.5/31.8/ 2.67) | 10:1 | 12,17.5 | f | 5 | e,i | 205 | poor cure |
| MMA/BA/ MMA/Lo PMMA/B-360 (42.5/19.6/7.97/ 13.2/16.5) | CX-100/ TEB*HMDA/ TS-720 (65.5/31.8/ 2.67) | 10:1 | 16 | i | 3 | e,i | 3489 | c |
| MMA/BA/MAA 1,6-HDDA/ Lo PMMA/B-36 (43.4/20.0/1.33/ 5.37/13.3/16.6) | CX-100/ TEB*HMDA/ TS-720 (65.5/31.8/ 2.67) | 10:1 | 18.5,24 | e,h | 25 | ej | 3055 | e |

EXAMPLE 4

A series of adhesive compositions according to the invention was prepared following the procedure described above and having the formulations shown below in Table 3 wherein the monomer mixture was varied and the aziridine-functional material, CX-100, was the only extender used. The T-Peel (on TEFLON and polyethylene) and lap shear Table 3 shows that several of the adhesive compositions of the invention have good peel strength on plastics and good shear strength on aluminum in addition to the good shear strength demonstrated in Tables 1 and 2. The fourth formulation, which had a lap shear strength of 205 psi, did not completely cure because the applicator syringe ran out of curative.

EXAMPLE 5

Example 5 demonstrates that adhesive compositions according to the invention that incorporate a polyaziridine demonstrate excellent hydrolytic stability, even when exposed to 75° C. water for several weeks. The monomer mixture for this example was 43.3 wt % MMA, 18.7 wt % BA, 2.67 wt % 1,6-HDDA, 5.37 wt % MAA, 13.3 wt % Med PMMA, and 16.6 wt % B-360. The curative mixture comprised 66.3 wt % CX-100, 31.1 wt % TEB*HMDA, and 2.67 wt % TS-720. Eighteen lap shear samples of high density polyethylene were prepared as described earlier using this adhesive composition. The samples were soaked in 75° C. water for up to 5 weeks. Samples were withdrawn from the water at weekly intervals for evaluation. The lap shear test results are shown in Table 4 below.

TABLE 4

| Time | Lap Shear Strength (psi) | Mode of Failure |
| --- | --- | --- |
| Initial | 789 | b,d |
| 1 Week | 758 | b,d,e |
| 2 Weeks | 793 | b |
| 3 Weeks | 665 | b,d,e |
| 4 Weeks | 729 | b,d,e |
| 5 Weeks | 587 | e |

Table 4 shows the strength retention of the adhesive formulation is excellent even after 5 weeks exposure to 75° C. water. The failure mode after five weeks was still primarily cohesive failure of the adhesive.

EXAMPLE 6

This example demonstrates that the instant invention can be used to generate adhesive formulations having a variety of commercially useful whole number mix ratios. Adhesive formulations were generated as described in the "Preparation of Monomer Mixtures" and "Preparation of Curative Mixtures" but using the mix ratios shown below in Table 5.

TABLE 5

| Adhesive Composition | | | Testing | | | | | |
| --- | --- | --- | --- | --- | --- | --- | --- | --- |
| | | Ratio of | TEFLON | | HDPE | | PP | |
| Monomer Mixture (Ratio) | Curative Mixture (Ratio) | Monomer Mixture to Curative Mixture | Lap Shear Strength (psi) | Failure Mode | Lap Shear Strength (psi) | Failure Mode | Lap Shear Strength (psi) | Failure Mode |
| MMA/BA/MAA/Lo PMMA/B-360 (44.4/20.5/5.10/5.00/25.0) | CX-100/TEB*HMDA/TS-720/P25 (5.76/34.9/2.60/4.90) | 10:1 | 382 | b | 707 | b | 900 | b,d |
| MMA/BA/MAA/Lo PMMA/B-360 (39.2/18.1/12.8/5.00/25.0) | CX-100/TEB*HMDA/TS-720/P25 (76.8/16.0/2.80/4.92) | 4:1 | 241 | f | 682 | b,d | 893 | b,d |
| MMA/BA/MAA/Lo PMMA/B-360 (29.0/13.3/27.6/5.00/25.0) | CX-100/TEB*HMDA/TS-720/P25 (83.0/9.60/2.60/2.90) | 2:1 | 9 | f | 337 | c | 413 | c,d |

EXAMPLE 7

This example shows that the organoborane amine complex contributes substantially to the excellent adhesion demonstrated by the compositions of the invention to low surface energy polymers. Formulations identical to those described in Example 6 were generated but having no organoborane amine complex.

TABLE 6

| Monomer Mixture (Ratio) | Curative Mixture (Ratio) | Ratio of Monomer Mixture to Curative Mixture |
| --- | --- | --- |
| MMA/BA/MAA/Lo PMMA/B-360 (44.4/20.5/5.10/5.00/25.0) | CX-100/TS-720/P25 (9.25/2.60/4.90) | 10:1 |
| MMA/BA/MAA/Lo PMMA/B-360 (39.2/18.1/12.8/5.00/25.0) | CX-100/TS-720/P25 (92.5/2.80/4.92) | 4:1 |
| MMA/BA/MAA/Lo PMMA/B-360 (29.0/13.3/27.6/5.00/25.0) | CX-100/TS-720/P25 (92.5/2.60/4.90) | 2:1 |

In each instance the lap shear strength, when measured by the procedure described earlier, was 0 psi and the adhesive did not cure.

EXAMPLE 8

This example evaluates the effect of varying the amount of boron in the adhesive compositions. Boron content (measured as a percent by weight based on the weight of the adhesive formulation) was calculated by the following equation:

$$\frac{\text{(weight of complex in the composition)} \times \text{(weight \% of boron in the complex)}}{\text{(Total weight of the composition less non-reactive components}}$$

Table 7 below shows the monomer mixtures and the curative mixtures that were used. In each instance these were combined in a 10:1 weight ratio.

EXAMPLE 9

This example shows adhesive formulations according to the invention that include hydroxy ethyl methacylate (HEMA) as an acrylic monomer. The monomer mixtures and curative mixtures are shown below in Table 8 where the mix ratio (monomer mixture:curative mixture) in each of the formulations was 10:1. The adhesives were tested for lap shear strength and failure mode using the previously described procedures.

TABLE 7

| Adhesive Composition | | | Testing | | | | | |
|---|---|---|---|---|---|---|---|---|
| | | | TEFLON | | HDPE | | PP | |
| | | | Lap | | Lap | | Lap | |
| Monomer Mixture (Ratio) | Curative Mixture (Ratio) | Wt. % Boron | Shear Strength (psi) | Failure Mode | Shear Strength (psi) | Failure Mode | Shear Strength (psi) | Failure Mode |
| MMA/BA/MAA/Lo PMMA/B-360 (44.3/20.4/5.37/3.23/26.7) | CX-100/TEB*/HMDA/TS-720 (95.7/1.60/2.67) | 0.01 | 0 | f | 0 | f | 0 | f |
| MMA/BA/MAA/Lo PMMA/B-360 (44.3/20.4/5.37/3.23/26.7) | CX-100/TEB*/HMDA/TS-720 (89.4/7.95/2.67) | 0.05 | 185 | f | 415 | c | 395 | f |
| MMA/BA MAA/Lo PMMA/B-360 (44.3/20.4/5.37/3.23/26.7) | CX-100/TEB*/HMDA/TS-720 (81.5/15.9/2.67) | 0.1 | 388 | b | 685 | b | 832 | d |
| MMA/BA/MAA/Lo PMMA/B-360 (44.3/20.4/5.37/3.23/26.7) | CX-100/TEB*/HMDA/TS-720 (73.5/23.8/2.67) | 0.15 | 377 | b | 688 | b | 992 | b,d |
| MMA/BA/MAA/Lo PMMA/B-360 (44.31/20.4/5.37/3.23/26.7) | CX-100/TEB*/HMDA/TS-720 (65.6/31.8/2.67) | 0.2 | 373 | b | 692 | b | 972 | d |

An effective amount of the organoborane amine complex is an amount that preferably provides about 0.03 to 1.5 weight % boron, more preferably about 0.08 to 0.5 weight % boron, most preferably about 0.1 to 0.3 weight % boron.

TABLE 8

| Adhesive Composition | | Testing | | | | | |
|---|---|---|---|---|---|---|---|
| | | TEFLON | | HDPE | | PP | |
| Monomer Mixture (Ratio) | Curative Mixture (Ratio) | Lap Shear Strength (psi) | Failure Mode | Lap Shear Strength (psi) | Failure Mode | Lap Shear Strength (psi) | Failure Mode |
| MMA/BA/ MAA/HEMA/ Lo PMMA/B-360 (45.3/ 20.9/4.86/ 0.56/3.10/25.3) | CX100/ TEB* HMDA/ TS-720 (67.0/27.7/ 5.20) | 369 | b | 699 | b | 1003 | b |
| MMA/BA/ MAA/HEMA/ Lo PMMA/ B-360 (44.8/ 20.6/3.40/ 2.80/3.10/25.3) | CX100/ TEB* HMDA/ TS-720 (67.0/27.7/ 5.20) | 360 | b,c,a | 691 | b | 786 | d |
| MMA/BA/ MAA/HEMA/ Lo PMMA/B-360 (44.5/ 20.5/2.50/ 4.20/3.10/25.3) | CX100/ TEB* HMDA/ TS-720 (67.0/27.7/ 5.20) | 267 | c,f | 687 | b | 730 | b,f |

The compositions of example 9 were less odorous than the compositions described in the other examples, due to the presence of the HEMA. The presence of CX-100 in the curative mixture also reduced the odor of this part of the composition.

EXAMPLE 10

Example 11 shows the utility of other amine reactive compounds such as anhydrides. Two part acrylic adhesive compositions were prepared as described above and having the formulations shown below in Table 9 in which the monomer mixture to curative mixture ratio was 10:1.

TABLE 9

| Adhesive Composition | | Testing | | | | | |
|---|---|---|---|---|---|---|---|
| | | TEFLON | | HDPE | | PP | |
| Monomer Mixture (Ratio) | Curative Mixture (Ratio) | Lap Shear Strength (psi) | Failure Mode | Lap Shear Strength (psi) | Failure Mode | Lap Shear Strength (psi) | Failure Mode |
| MMA/BA/ MA-Anh/1,6-HDDA/ PMMA/B-360 (40.9/18.8/ 4.30/1.31/8.80/ 26.0) | CX-100/TEB* HMDA/ TS-720 (67.0/ 27.7/5.20) | 292 | e | 829 | b,e | 1118 | d |
| MMA/BA/ MA-Anh/ 1,6-HDDA/ PMMA/B-360 (42.1/18.8/ 4.30/8.80/ 26.0) | CX-100/TEB* HMDA/ TS-720 (67.0/ 27.7/5.20) | 350 | e | 736 | b,c | 1030 | d |
| MMA/BA/ MA-Anh/ PMMA/B-360 (45.8/21.4/ 4.50/25.3) | CX-100/TEB* HMDA/ TS-720 (67.0/ 27.7/5.20) | 283 | e | 197 | f | 1045 | d |
| MMA/BA/ MA-Anh/ PMMA/B-360 (44.3/18.8/ 2.20/8.80/ 26.0) | CX-100/TEB* HMDA/TS-720 (67.0/ 27.7/5.20) | 291 | e | 813 | b,e | 1169 | d |

TABLE 9-continued

| Adhesive Composition | | Testing | | | | | |
|---|---|---|---|---|---|---|---|
| | | TEFLON | | HDPE | | PP | |
| Monomer Mixture (Ratio) | Curative Mixture (Ratio) | Lap Shear Strength (psi) | Failure Mode | Lap Shear Strength (psi) | Failure Mode | Lap Shear Strength (psi) | Failure Mode |
| MMA/BA/ICI 2010/B-360/Ac-Anh/MA-Anh [46.1/21.5/3.13/25.5/1.48/2.24] | CX-100/TEB*HMDA/TS-720/P25 Titania [62.2/27.8/5.0/5.0] | 383 | b | 704 | b,e | 946 | b,d |
| MMA/BA/ICI 2010/B-360/Ac-Anh/MA-Anh [45.9/21.5/3.11/25.4/0.74/3.36] | CX-100/TEB*HMDA/TS720/P25 [62.2/27.8/5.00/5.00] | 359 | b,c | 665 | b | 1001 | b |

These examples show that anhydrides and or combinations of anhydrides can be used as amine-reactive compounds in the composition of the invention.

EXAMPLE 11

The following samples were prepared:
A. Crystals of TEB*HMDA.
B. A 60:40 by weight mixture of CX-100:TEB*HMDA The material was a straw-colored, somewhat viscous, clear solution.
C. A 59.3:28.8:7.10:4.80 by weight mixture of CX-100:TEB*HMDA:TS-720:TiO$_2$. The mixture was prepared by dissolving the first two ingredients in each other. The resulting solution was then placed in a high speed blender to which was added the last two ingredients. The material was a whitish-tan, thixotropic liquid.

The samples were subjected to an autoignition test according to ASTM D-1929 with the following results:

TABLE 10

| Sample | Autoignition Temperature (°C.) |
|---|---|
| A | 105 |
| B | 126.7 |
| C | 165.6 |

These data show that the autoignition temperature of an organoborane amine complex can be advantageously increased by incorporating the same into the compositions of the invention.

Various modifications and alterations of this invention will become apparent to those skilled in the art without departing from the scope and spirit of the invention. It should be understood that this invention is not limited to the illustrative embodiments set forth herein.

The embodiments for which an exclusive property or privilege is claimed are defined as follows:

1. A composition comprising organoborane amine complex and aziridine-functional material.

2. A composition according to claim 1 which is a room temperature liquid solution of the organoborane amine complex and the aziridine-functional material.

3. A composition according to claim 1 wherein the aziridine-functional material is a polyaziridine.

4. A composition according to claim 3 wherein the polyaziridine has an aziridine functionality of 3.

5. A composition according to claim 4 wherein the polyaziridine is selected from the group consisting of tris-aziridine of trimethylolpropane triacrylate, tris-methyl aziridine of trimethylolpropane triacrylate, tris-aziridine of pentaerythritol triacrylate, and tris-methyl aziridine of pentaerythritol triacrylate.

6. A composition according to claim 3 wherein the amine portion of the organoborane amine complex is a polyamine having an amine functionality of 2 to 4.

7. A room temperature liquid solution comprising:
 (a) a complex of:
  (1) organoborane having the structure:

wherein:
   $R^1$ is an alkyl group having 1 to 10 carbon atoms;
   $R^2$ and $R^3$ are independently selected from alkyl groups having 1 to 10 carbon atoms and phenyl-containing groups; and
  (2) polyamine selected from the group consisting of alkyl polyamine, polyoxyalkylenepolyamine, and the reaction product of a diprimary amine-terminated material and a material having at least two groups reactive with primary amine, wherein the number of primary amine groups in the reaction mixture was greater than the number of groups reactive with primary amine; and
 (b) polyaziridine.

8. A polymerization initiator system comprising:
 (a) organoborane amine complex;
 (b) a compound reactive with the amine component of the complex to liberate the organoborane; and
 (c) aziridine-functional material.

9. A polymerization initiator system according to claim 8 wherein the aziridine-functional material is a polyaziridine.

10. A polymerization initiator system according to claim 9 wherein the polyaziridine is selected from the group consisting of tris-aziridine of trimethylolpropane triacrylate, tris-methyl aziridine of trimethylol propane triacrylate, tris-aziridine of pentaerythritol triacrylate, and tris-methyl aziridine of pentaerythritol triacrylate.

11. A polymerization initiator system according to claim 8 wherein the compound reactive with the amine component of the complex is an acid or an anhydride.

12. A polymerization initiator system according to claim 8 wherein the compound reactive with the amine component of the complex is acrylic acid or methacrylic acid.

13. A polymerization initiator system according to claim 8 wherein the amine portion of the complex is a polyamine.

14. A polymerization initiator system according to claim 13 wherein the polyamine is selected from the group consisting of alkyl polyamine, polyoxyalkylenepolyamine, and the reaction product of a diprimary amine-terminated material and a material having at least two groups reactive with primary amine, wherein the number of primary amine groups in the reaction mixture was greater than the number of groups reactive with primary amine.

15. A polymerizable composition comprising:
    (a) polymerizable acrylic monomer;
    (b) organoborane amine complex;
    (c) aziridine-functional material; and
    (d) compound reactive with the amine portion of the complex to liberate organoborane from the complex.

16. A polymerizable composition according to claim 15 wherein the polymerizable acrylic monomer is selected from the group consisting of monofunctional acrylate ester, monofunctional methacrylate ester, substituted derivatives of the foregoing, and blends of the foregoing.

17. A polymerizable composition according to claim 15 wherein the composition comprises about 0.03 to 1.5 weight % boron, based on the total weight of the polymerizable composition, less any non-reactive components.

18. A polymerizable composition according to claim 17 wherein the composition comprises about 0.1 to 0.3 weight % boron, based on the total weight of the polymerizable composition, less any non-reactive components.

19. A polymerizable composition according to claim 15 wherein the organoborane amine complex has the structure

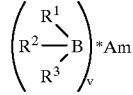

wherein:
$R^1$ is an alkyl group having 1 to 10 carbon atoms;
$R^2$ and $R^3$ are independently selected from alkyl groups having 1 to 10 carbon atoms and phenyl-containing groups;
Am is a polyamine selected from the group consisting of alkyl polyamine, polyoxyalkylenepolyamine, and the reaction product of a diprimary amine-terminated material and a material having at least two groups reactive with primary amine, wherein the number of primary amine groups in the reaction mixture was greater than the number of groups reactive with primary amine; and
v is the ratio of primary amine nitrogen atoms to boron atoms in the complex.

20. A polymerizable composition according to claim 15 wherein the aziridine-functional material is a polyaziridine.

21. A polymerizable composition according to claim 20 wherein the polyaziridine has an aziridine functionality of 3.

22. A polymerizable composition according to claim 20 wherein the polyaziridine is selected from the group consisting of tris-aziridine of trimethylolpropane triacrylate, tris-methyl aziridine of trimethylolpropane triacrylate, tris-aziridine of pentaerythritol triacrylate, and tris-methyl aziridine of pentaerythritol triacrylate.

23. A polymerizable composition according to claim 15 wherein the compound that is reactive with the amine portion of the complex is selected from the group consisting of acids, acid chlorides, aldehydes, anhydrides, isocyanates, and sulfonyl chlorides.

24. A polymerizable composition according to claim 23 wherein the compound that is reactive with the amine portion of the complex is an acid.

25. A polymerizable composition according to claim 15 wherein the organoborane amine complex is soluble in the aziridine-functional material, and the aziridine-functional material is soluble in the acrylic monomer.

26. An adhesive composition that can be applied and cured at room temperature comprising:
    (a) a polymerizable blend of alkyl acrylate monomer and alkyl methacrylate monomer;
    (b) an optional organic thickener;
    (c) an organoborane polyamine complex which provide about 0.08 to 0.5 wt. % boron, based on the total weight of the adhesive composition less any non-reactive components, the complex having the structure:

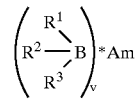

wherein:
$R^1$ is an alkyl group having 1 to 10 carbon atoms;
$R^2$ and $R^3$ are independently selected from alkyl groups having 1 to 10 carbon atoms and phenyl-containing groups;
Am is a polyamine selected from the group consisting of alkyl polyamine, polyoxyalkylenepolyamine, and the reaction product of a diprimary amine-terminated material and a material having at least two groups reactive with primary amine, wherein the number of primary amine groups in the reaction mixture was greater than the number of groups reactive with primary amine; and
v is the ratio of primary amine nitrogen atoms to boron atoms in the complex;
    (d) an aziridine-functional material in which the organoborane polyamine complex is soluble and which can crosslink the polymerizable blend or the polymerization product thereof, and
    (e) an effective amount of a compound that reacts with the polyamine to liberate the organoborane for initiating polymerization of the polymerizable blend.

27. An adhesive composition according to claim 26 wherein the compound that reacts with the polyamine can also be copolymerized with the polymerizable blend.

28. An adhesive composition according to claim 26 wherein the adhesive composition is a 100% solids, two-part curable adhesive composition comprising:
    (a) a first part comprising a solution of the organoborane polyamine complex and the aziridine-functional material, wherein the aziridine-functional material is not reactive with the polyamine; and (b) a second part comprising:
   (1) the polymerizable blend of alkyl acrylate monomer and alkyl methacrylate monomer; and
   (2) the compound that reacts with the polyamine.

29. An adhesive composition according to claim 28 wherein the polyaziridine is selected from the group consisting of tris-aziridine of trimethylolpropane triacrylate, tris-methyl aziridine of trimethylolpropane triacrylate, tris-aziridine of pentaerythritol triacrylate, and tris-methyl aziridine of pentaerythritol triacrylate.

30. An adhesive composition according to claim 29 wherein the compound that reacts with polyamine is acrylic acid or methacrylic acid.

31. An adhesive composition according to claim 29 wherein the compound that reacts with polyamine is an acid anhydride.

32. An adhesive composition according to claim 28 wherein the first part and the second part are combined in a whole number ratio of 1:1 to 1:10.

33. An adhesive composition according to claim 32 wherein the first part and the second part are each in a different receptacle of a two-part adhesive dispenser.

34. A bonded composite comprising a first substrate and a second substrate adhesively bonded together by a layer of a cured adhesive composition according to claim 26.

35. A bonded composite according to claim 34 wherein at least one of the first and second substrates is a low surface energy polymeric material.

36. A bonded composite according to claim 35 wherein the first and second substrates are each independently selected from low surface energy polymeric materials.

37. A bonded composite according to claim 36 wherein the first and second substrates are each independently selected from the group consisting of polyethylene, polypropylene and polytetrafluoroethylene.

38. A bonded composite according to claim 35 wherein at least one substrate is selected from the group consisting of polyethylene, polypropylene, and polytetrafluoroethylene.

39. A bonded composite comprising a first substrate and a second substrate adhesively bonded together by a layer of a cured composition according to claim 28.

40. A bonded composite according to claim 39 wherein the first and second substrates are each independently selected from low surface energy polymeric materials.

41. A bonded composite according to claim 40 wherein the first and second substrates are each independently selected from the group consisting of polyethylene, polypropylene and polytetrafluoroethylene.

* * * * *